(12) United States Patent
Hagiwara et al.

(10) Patent No.: US 10,042,591 B2
(45) Date of Patent: Aug. 7, 2018

(54) IMAGE FORMING APPARATUS, SYSTEM, AND CONTROL METHOD

(71) Applicants: KABUSHIKI KAISHA TOSHIBA, Tokyo (JP); TOSHIBA TEC KABUSHIKI KAISHA, Tokyo (JP)

(72) Inventors: Takahiro Hagiwara, Chiba Chiba (JP); Shinji Makishima, Sunto Shizuoka (JP); Koji Endo, Sunto Shizuoka (JP); Hiroshi Watanabe, Yokohama Kanagawa (JP); Akihiro Mizutani, Mishima Shizuoka (JP); Toshihiro Ida, Mishima Shizuoka (JP); Yusuke Hamada, Mishima Shizuoka (JP); Kazuhiro Ogura, Hiratsuka Kanagawa (JP); Takeo Nishijima, Mishima Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/377,252

(22) Filed: Dec. 13, 2016

(65) Prior Publication Data
US 2018/0165045 A1 Jun. 14, 2018

(51) Int. Cl.
*G06K 15/00* (2006.01)
*G06F 3/12* (2006.01)
(Continued)

(52) U.S. Cl.
CPC .......... *G06F 3/1238* (2013.01); *G06F 3/1205* (2013.01); *G06F 3/1222* (2013.01); *G06F 3/1231* (2013.01); *H04N 1/0023* (2013.01); *H04N 1/00344* (2013.01); *H04N 1/00347* (2013.01); *H04N 1/32523* (2013.01); *H04N 1/4413* (2013.01); *H04N 1/4433* (2013.01); *H04N 2201/0094* (2013.01); *H04N 2201/3205* (2013.01); *H04N 2201/3207* (2013.01); *H04N 2201/3222* (2013.01)

(58) Field of Classification Search
None
See application file for complete search history.

(56) References Cited

U.S. PATENT DOCUMENTS

| 9,201,621 B2 | 12/2015 | Minagawa | |
|---|---|---|---|
| 2007/0086052 A1* | 4/2007 | Furuya | H04L 67/16 358/1.15 |
| 2008/0007767 A1* | 1/2008 | Ishimaru | G06F 21/35 358/1.15 |

FOREIGN PATENT DOCUMENTS

JP 2010152726 7/2010

* cited by examiner

*Primary Examiner* — Dov Popovici
(74) *Attorney, Agent, or Firm* — Patterson & Sheridan, LLP

(57) ABSTRACT

According to one embodiment, an image forming apparatus includes a processor, a network interface and a display device. The network interface under processor control acquires identification information of a different image forming apparatus on which a user is determined to have use authority based on user identification information of the user. The network interface under processor control also acquires an image forming job registered with the different image forming apparatus based on the acquired identification information of the different image forming apparatus. The display device under processor control displays the image forming job acquired by the network interface.

10 Claims, 27 Drawing Sheets

(51) Int. Cl.
*H04N 1/00* (2006.01)
*H04N 1/32* (2006.01)
*H04N 1/44* (2006.01)

FIG. 3

SHARED PRINTER SETTING MANAGEMENT TABLE
2621

| SHARED NUMBER | USER ID | PRINTER ID |
|---|---|---|
| S00001 | USR00001 | PRTA |
| S00002 | USR00002 | PRTB |
| S00003 | USR00003 | PRTC |
| S00004 | USR00004 | PRTA |
| S00005 | USR00004 | PRTB |
| ⋮ | ⋮ | ⋮ |

FIG. 4

(1) PRINTING JOB MANAGEMENT TABLE (PRINTER A) 2622

| JOB NUMBER | PRINTING JOB RECEIVING TIME | DOCUMENT NAME | JOB STATUS | USER ID | PRINTING DATA STORAGE LOCATION | FORMAT | COLOR MODE | N in 1 | DOUBLE-SIDED MODE | STAPLING | PUNCH HOLE |
|---|---|---|---|---|---|---|---|---|---|---|---|
| JB00001 | 2016/03/20 15:05:41 | PRINTING TITLE 5 | TEMPORARY STOP | USR00004 | /PRTA/JB00004/ | PDF | BLACK AND WHITE | 1 | ONE SURFACE | ABSENT | ABSENT |
| JB00002 | 2016/03/20 18:01:03 | PRINTING TITLE A | TEMPORARY STOP | USR00001 | /PRTA/JB00003/ | PDF | BLACK AND WHITE | 2 | BOTH SURFACES | TWO PORTIONS ON LEFT SIDE | ABSENT |
| JB00003 | 2016/03/20 18:54:40 | PRINTING TITLE 7 | TEMPORARY STOP | USR00004 | /PRTA/JB00002/ | PDF | BLACK AND WHITE | 2 | BOTH SURFACES | UPPER LEFT SIDE | ABSENT |
| JB00004 | 2016/03/20 19:05:41 | PRINTING TITLE 8 | TEMPORARY STOP | USR00004 | /PRTA/JB00001/ | PDF | BLACK AND WHITE | 2 | BOTH SURFACES | ABSENT | ABSENT |
| ... | | | | | | | | | | | |

(2) PRINTING JOB MANAGEMENT TABLE OF PRINTER B

| JOB NUMBER | PRINTING JOB RECEIVING TIME | DOCUMENT NAME | JOB STATUS | USER ID | PRINTING DATA STORAGE LOCATION | FORMAT | COLOR MODE | N in 1 | DOUBLE-SIDED MODE | STAPLING | PUNCH HOLE |
|---|---|---|---|---|---|---|---|---|---|---|---|
| JB00001 | 2016/03/20 08:51:15 | PRINTING TITLE 3 | TEMPORARY STOP | USR00004 | /PRTB/JB00007/ | PDF | FULL COLOR | 1 | ONE SURFACE | UPPER LEFT SIDE | ABSENT |
| JB00002 | 2016/03/20 09:54:40 | PRINTING TITLE B | TEMPORARY STOP | USR00002 | /PRTB/JB00006/ | PDF | FULL COLOR | 1 | BOTH SURFACES | ABSENT | ABSENT |
| JB00003 | 2016/03/20 10:36:31 | PRINTING TITLE 4 | TEMPORARY STOP | USR00004 | /PRTB/JB00005/ | PDF | BLACK AND WHITE | 1 | ONE SURFACE | ABSENT | ABSENT |
| JB00004 | 2016/03/20 13:05:41 | PRINTING TITLE BB | TEMPORARY STOP | USR00002 | /PRTB/JB00004/ | PDF | FULL COLOR | 1 | BOTH SURFACES | TWO PORTIONS ON LEFT SIDE | ABSENT |
| JB00005 | 2016/03/20 16:33:04 | PRINTING TITLE 6 | TEMPORARY STOP | USR00004 | /PRTB/JB00003/ | PDF | BLACK AND WHITE | 1 | ONE SURFACE | ABSENT | ABSENT |
| JB00006 | 2016/03/20 19:01:03 | PRINTING TITLE 9 | TEMPORARY STOP | USR00004 | /PRTB/JB00002/ | PDF | BLACK AND WHITE | 1 | ONE SURFACE | ABSENT | LEFT SIDE |
| JB00007 | 2016/03/20 19:05:43 | PRINTING TITLE 10 | TEMPORARY STOP | USR00004 | /PRTB/JB00001/ | PDF | FULL COLOR | 1 | ONE SURFACE | ABSENT | ABSENT |
| ... | | | | | | | | | | | |

(3) PRINTING JOB MANAGEMENT TABLE OF PRINTER C

| JOB NUMBER | PRINTING JOB RECEIVING TIME | DOCUMENT NAME | JOB STATUS | USER ID | PRINTING DATA STORAGE LOCATION | FORMAT | COLOR MODE | N in 1 | DOUBLE-SIDED MODE | STAPLING | PUNCH HOLE |
|---|---|---|---|---|---|---|---|---|---|---|---|
| JB00001 | 2016/03/20 15:06:22 | PRINTING TITLE C | COMPLETE PRINTING | USR00003 | /PRTC/JB00004/ | PDF | FULL COLOR | 1 | ONE SURFACE | ABSENT | ABSENT |
| JB00002 | 2016/03/20 15:08:33 | PRINTING TITLE CC | COMPLETE PRINTING | USR00003 | /PRTC/JB00003/ | PDF | BLACK AND WHITE | 1 | ONE SURFACE | ABSENT | ABSENT |
| JB00003 | 2016/03/20 15:15:03 | PRINTING TITLE CCC | COMPLETE PRINTING | USR00003 | /PRTC/JB00002/ | PDF | FULL COLOR | 1 | BOTH SURFACES | ABSENT | ABSENT |
| JB00004 | 2016/03/20 20:16:22 | PRINTING TITLE CCCC | IN EXECUTION | USR00003 | /PRTC/JB00001/ | PDF | FULL COLOR | 1 | BOTH SURFACES | ABSENT | ABSENT |
| ... | | | | | | | | | | | |

| PRINTER ID | PRINTER NAME | INSTALLATION LOCATION | PRINTER STATUS | COLOR MODE | DOUBLE-SIDED MODE | STAPLING | PUNCH HOLE | ... |
|---|---|---|---|---|---|---|---|---|
| PRTA | SHARED PRINTER A | OFFICE A | Online | BLACK AND WHITE | BOTH SURFACES | PRESENT | ABSENT | ... |
| PRTB | SHARED PRINTER B | OFFICE B | Online | FULL COLOR | BOTH SURFACES | PRESENT | PRESENT | ... |
| PRTC | SHARED PRINTER C | OFFICE C | Online | FULL COLOR | BOTH SURFACES | ABSENT | ABSENT | ... |
| ... | ... | ... | ... | ... | ... | ... | ... | ... |

FIG. 6

USER MANAGEMENT TABLE 2624

| USER ID | USER NAME |
|---------|-----------|
| USR00001 | USER A |
| USR00002 | USER B |
| USR00003 | USER C |
| USR00004 | USER D |
| ⋮ | ⋮ |

FIG. 12

| No | DOCUMENT NAME | RECEPTION DATE AND TIME | PRINTING SETTING | SHARED PRINTER NAME |
|----|---------------|-------------------------|------------------|---------------------|
| 1 | PRINTING TITLE 8 | 20, 18:55 | ■ 2 ▮ | PRINTER A |
| 2 | PRINTING TITLE 7 | 20, 18:54 | ■ 2 ▮ | PRINTER A |
| 3 | PRINTING TITLE 6 | 20, 16:33 | ■ 1 ▮ | PRINTER B |
| 4 | PRINTING TITLE 5 | 20, 15:05 | ■ 2 ▮ | PRINTER A |
| 5 | PRINTING TITLE 4 | 20, 10:36 | ■ 1 ▮ | PRINTER B |
| 6 | | | | |
| 7 | | | | |
| 8 | | | | |

SHARED PRINTER PRINTING SYSTEM — USER ID

PLEASE SELECT PRINTING JOB

DELETE | CLEAR SELECTION | SELECT ALL | FILTER OFF | PRINT

UPDATE

FIG. 13

| No | DOCUMENT NAME | RECEPTION DATE AND TIME | PRINTING SETTING | SHARED PRINTER NAME |
|---|---|---|---|---|
| 1 | PRINTING TITLE 10 | 20, 19:05 | | PRINTER B |
| 2 | PRINTING TITLE 9 | 20, 19:01 | | PRINTER B |
| 3 | PRINTING TITLE 8 | 20, 18:55 | | PRINTER A |
| 4 | PRINTING TITLE 7 | 20, 18:54 | | PRINTER A |
| 5 | PRINTING TITLE 6 | 20, 16:33 | | PRINTER B |
| 6 | PRINTING TITLE 5 | 20, 15:05 | | PRINTER A |
| 7 | PRINTING TITLE 4 | 20, 10:36 | | PRINTER B |
| 8 | PRINTING TITLE 3 | 20, 08:51 | | PRINTER B |

SHARED PRINTER PRINTING SYSTEM — USER ID

PLEASE SELECT PRINTING JOB

DELETE | CLEAR SELECTION | SELECT ALL | FILTER OFF | PRINT

IMAGE FORMING APPARATUS, SYSTEM, AND CONTROL METHOD

FIELD

Embodiments described herein relate generally to an image forming apparatus, a system, and a control method.

BACKGROUND

In the related art, a system is used in which only users having printing authority are able to share and use a printer. When multiple printers are included in such a system, printing output can be obtained from a printer in which a printing job is registered. However, the printing output cannot be obtained from printers other than the printer in which the printing job is registered.

DESCRIPTION OF THE DRAWINGS

FIG. 3 is a diagram illustrating an example of a shared printer setting management table.

FIG. 4 is a diagram illustrating an example of a printing job management table.

FIG. 5 is a diagram illustrating an example of a printer information management table.

FIG. 6 is a diagram illustrating an example of a user management table.

FIG. 12 is a first display example of a printing job list displayed on an operation panel of a printer.

FIG. 13 is a second display example of the printing job list displayed on the operation panel of the printer.

DETAILED DESCRIPTION

According to one embodiment, an image forming apparatus includes a processor, a network interface and a display device. The network interface under processor control acquires identification information of a different image forming apparatus on which a user is determined to have use authority based on user identification information of the user. The network interface under processor control also acquires an image forming job registered with the different image forming apparatus based on the acquired identification information of the different image forming apparatus. The display device under processor control displays the image forming job acquired by the network interface.

Hereinafter, an image forming apparatus, a system, and a control method of an embodiment will be described with reference to the drawings.

Figure 1:
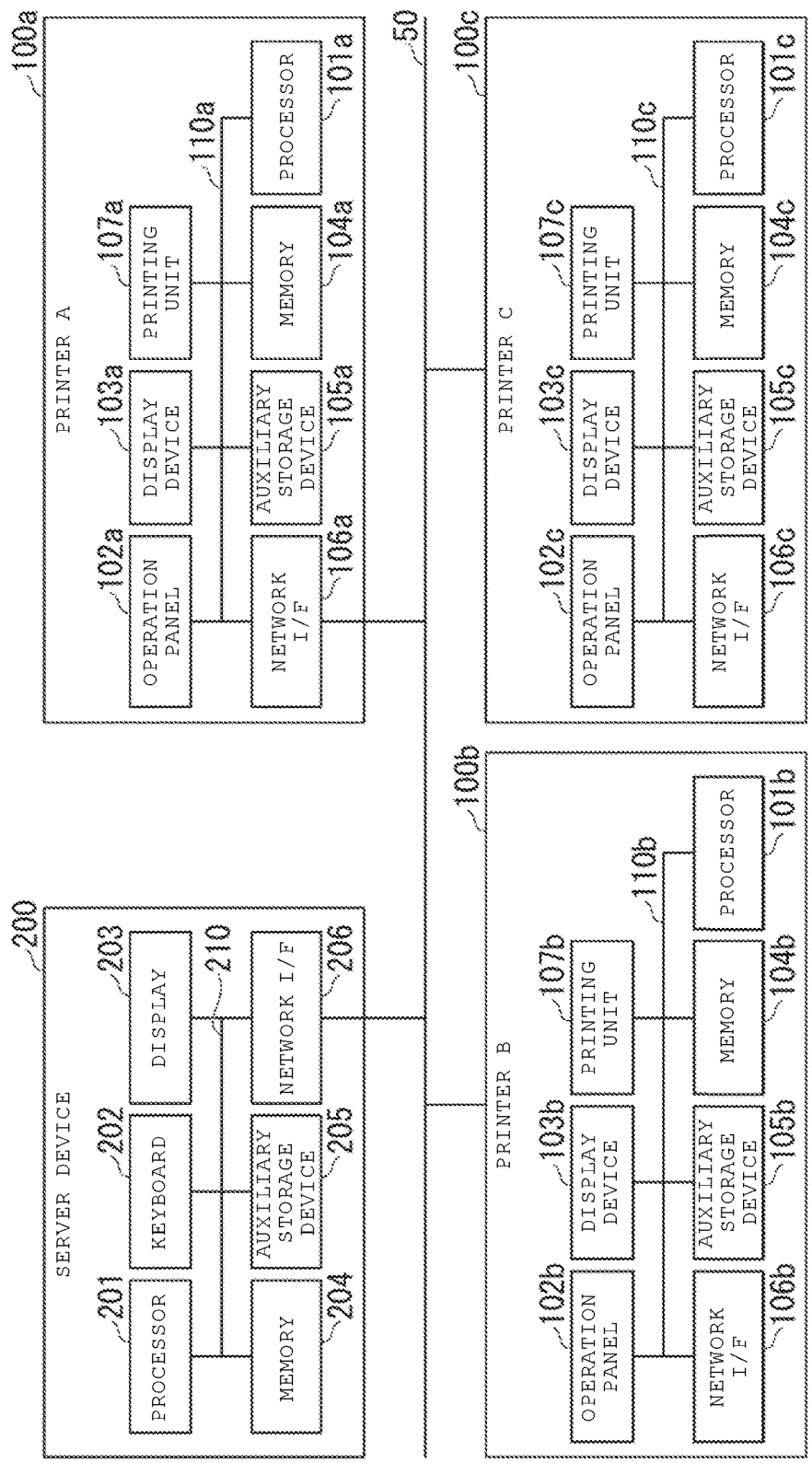
FIG. 1 is a block diagram illustrating an example configuration of a shared printer system according to an embodiment.

FIG. 1 is a block diagram illustrating an example configuration of a shared printer system according to an embodiment. The shared printer system includes a printer A 100a, a printer B 100b, a printer C 100c, and a server device 200. The printer A 100a, the printer B 100b, the printer C 100c, and the server device 200 are connected to each other through a LAN 50.

The printer A 100a, the printer B 100b, and the printer C 100c, for example, are image forming apparatuses such as a multi-function peripheral. The printer A 100a includes a processor 101a, an operation panel 102a, a display device 103a, a memory 104a, an auxiliary storage device 105a, a network I/F 106a, a printing unit 107a, and an internal bus 110a. The printer B 100b includes a processor 101b, an operation panel 102b, a display device 103b, a memory 104b, an auxiliary storage device 105b, a network I/F 106b, a printing unit 107b, and an internal bus 110b. The printer C 100c includes a processor 101c, an operation panel 102c, a display device 103c, a memory 104c, an auxiliary storage device 105c, a network I/F 106c, a printing unit 107c, and an internal bus 110c.

Hereinafter, when the printer A 100a, the printer B 100b, and the printer C 100c are not distinguished from each other, the printer A 100a, the printer B 100b, and the printer C 100c will be referred to as a printer 100. In addition, the same applies to each configuration of the printer 100 and each component of the printer 100, including the processor 101, the operation panel 102, the display device 103, the memory 104, the auxiliary storage device 105, the network I/F 106, and the printing unit 107.

A processor 101, for example, executes a control program stored in an auxiliary storage device 105 by using a memory 104 as a work memory, and controls each unit of the printer 100. An operation panel 102 includes a plurality of buttons. The operation panel 102 receives an operation of a user. The operation panel 102 outputs a signal according to the operation performed by the user to the processor 101 of the printer 100. A display device 103 is an image display device such as a liquid crystal display or an organic electro luminescence (EL) display. The display device 103 displays various information items relevant to the printer 100. Furthermore, the display device 103 and the operation panel 102 may be configured as an integrated touch panel. When the processor 101 executes the program, the memory 104 is used as the work memory. The auxiliary storage device 105 stores a program, user information, printing data, and the like. A network I/F 106 is an interface for communicating with devices over a network 50, such as with a server device 200. A printing unit 107 forms an image on a sheet based on the printing data. The printing unit 107 may be a device fixing a toner image, or may be an ink jet type device. An internal bus 110 connects the processor 101, the operation panel 102, the display device 103, the memory 104, the auxiliary storage device 105, the network I/F 106, and the printing unit 107 to each other. Each unit connected to the internal bus 110 is configured such that the units are able to exchange data to each other through the internal bus 110.

A server device 200 includes a processor 201, a keyboard 202, a display 203, a memory 204, an auxiliary storage device 205, a network I/F 206, and an internal bus 210.

The processor 201, for example, executes a control program stored in the auxiliary storage device 205 by using the memory 204 as a work memory, and controls each unit of the server device 200. The keyboard 202 includes a plurality of buttons. The keyboard 202 receives an operation of a user. The keyboard 202 outputs a signal according to the operation performed by the user to the processor 201. The display 203 is an image display device such as a liquid crystal display and an organic EL display. The display 203 displays various information items relevant to the server device 200. Furthermore, the display 203 and the keyboard 202 may be configured as an integrated touch panel. When the processor 201 executes the program, the memory 204 is used as the work memory. The auxiliary storage device 205 stores user information, printing job information, printing data, a program, and the like. The network I/F 206 is an interface for communicating with the printer 100. The internal bus 210 connects the processor 201, the keyboard 202, the display 203, the memory 204, the auxiliary storage device 205, and the network I/F 206 to each other. Each unit connected to the internal bus 210 is configured such that the units are able to exchange data to each other through the internal bus 110.

Shared Printer System

In the shared printer system according to the embodiment, the printer A 100a, the printer B 100b, and the printer C 100c are shared by a plurality of users.

The server device 200 stores user identification information such as a user ID in association with identification information of each printer such as a plurality of printer IDs corresponding to printers 100 over which the user has use authority. Further, the server device 200 stores an image forming job. The server device 200 registers the image forming job which is received from a terminal device such as a client terminal, acquires the plurality of printer IDs based on the user ID received from the printer 100, and acquires the image forming job which is registered in each of the plurality of printers. The printer 100 transmits information indicating the plurality of printer IDs and the image forming job to the server.

The printer 100 acquires the plurality of printer IDs over which the user has use authority based on the user ID, and acquires the image forming job registered in each of the plurality of printers based on the plurality of printer IDs. The printer 100 processes printing data corresponding to an image forming job selected by the user.

Functional Configuration of Shared Printer System

Figure 2:
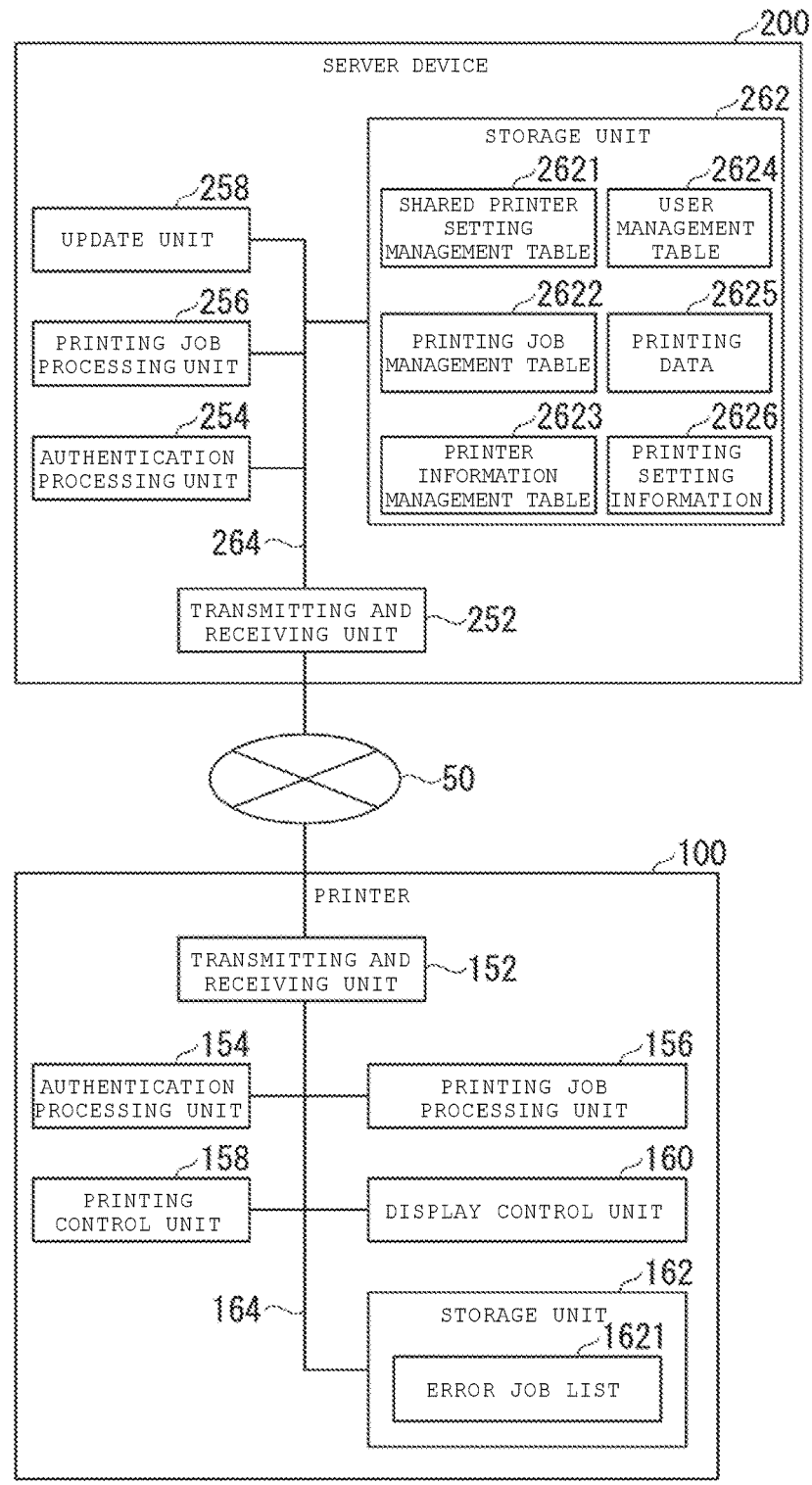
FIG. 2 is a functional block diagram illustrating an example configuration of the shared printer system.

FIG. 2 is a functional block diagram of the shared printer system including the printer 100 and the server device 200.

Functional Configuration of Printer 100

The printer 100 is configured with various functional blocks including a transmitting and receiving unit 152, an authentication processing unit 154, a printing job processing unit 156, a printing control unit 158, a display control unit 160, a storage unit 162, and a bus line 164 such as an address bus or a data bus for electrically connecting each of the components described above as illustrated in FIG. 2. Each of the units has a function which is achieved by operating any one of the components illustrated in FIG. 2 according to a command from the processor 101 executing a program decompressed on the memory 104 from the auxiliary storage device 105.

Each functional configuration of the printer 100 will be described in detail with reference to FIG. 1 and FIG. 2. Furthermore, hereinafter, in the description of each of the functional configurations of the printer 100, a relationship with respect to main hardware for implementing each of the functional configurations of the printer 100 in each of the components illustrated in FIG. 2 will be also described.

The transmitting and receiving unit 152 is implemented by the network I/F 106 operating under the control of the processor 101. The transmitting and receiving unit 152 transmits and receives various data items with respect to other devices such as the server device 200.

The authentication processing unit 154 is implemented by the processor 101 programmed to carry out the functions of the authentication processing unit 154 described below. The authentication processing unit 154 authenticates the user. For example, the user accesses a server providing a service from the printer 100, inputs a user ID and a password to be required from the operation panel or the like, and transmits the user ID and the password to the server. When the authentication succeeds, the printer 100 manages HTTP Cookie information, an access token necessary for access authority for accessing a specific service API, or the like which is transmitted from the server.

The printing job processing unit 156 is implemented by the processor 101 programmed to carry out the functions of the printing job processing unit 156 described below. The printing job processing unit 156 processes the image forming job based on the printing data which is received from the terminal device or the like. The printing job processing unit 156 acquires the printer IDs of the plurality of printers over which the user has use authority based on the user ID of the user successful in the authentication. The printing job processing unit 156 acquires the image forming job registered in each of the plurality of printers based on the printer IDs of the plurality of printers.

The printing control unit 158 is under the control of the processor 101 and is implemented by a print controller of the printing unit 107. The printing control unit 158 processes the printing data corresponding to the image forming job selected by the user in the image forming job which is acquired by the printing job processing unit 156.

The display control unit 160 is under the control of the processor 101 and is implemented by the display device 103. The display control unit 160 displays the printing job list or the like which is acquired by the printing job processing unit 156 on the display device 103.

The storage unit 162 is the memory 104 and the auxiliary storage device 105. The storage unit 162 stores an error job list 1621 and other data under control of the processor 101.

The server device 200 is configured with various functional blocks including a transmitting and receiving unit 252, an authentication processing unit 254, a printing job processing unit 256, an update unit 258, a storage unit 262, and a bus line 264 such as an address bus or a data bus for electrically connecting each of the components described above as illustrated in FIG. 2. Each of the units has a function which is achieved by operating any one of components illustrated in FIG. 2 according to a command from the processor 201 executing a program decompressed on the memory 204 from the auxiliary storage device 205.

Each functional configuration of the server device 200 will be described in detail with reference to FIG. 1 and FIG. 2. Furthermore, hereinafter, in the description of each of the functional configurations of the server device 200, a relationship with respect to main hardware for implementing each of the functional configurations of the server device 200 in each of the components illustrated in FIG. 2 will be also described.

The transmitting and receiving unit 252 is implemented by the network I/F 206 operating under control of the processor 201. The transmitting and receiving unit 252 transmits and receives various data items with respect to other devices such as the printer 100.

The authentication processing unit 254 is implemented by the processor 201 programmed to carry out the functions of the authentication processing unit 254. The authentication processing unit 254 authenticates the user. For example, the authentication processing unit 254 authenticates the user by comparing the user ID which is transmitted from the printer 100 with the user information of the user using the server device 200, which is managed by the server device 200. When the authentication succeeds, HTTP Cookie information for specifying the user is transmitted to the printer 100. The printer 100 retains the HTTP Cookie, and then, performs user authentication with respect to the server device 200 by adding the HTTP Cookie.

The printing job processing unit 256 is implemented by the processor 201 programmed to carry out the functions of the printing job processing unit 256 described below. When the printing data from the terminal device or the like is received, the printing job processing unit 256 registers the image forming job.

The update unit 258 is implemented by the processor 201 programmed to store data in the memory 204 and the auxiliary storage device 205. The update unit 258 updates information stored in the storage unit 262.

The storage unit 262 is the memory 204 and the auxiliary storage device 205. The storage unit 262 is controlled by the processor 201 to store a shared printer setting management table 2621, a printing job management table 2622, a printer information management table 2623, a user management table 2624, printing data 2625, and printing setting information 2626.

FIG. 3 illustrates an example of a shared printer setting management table.

In the shared printer setting management table 2621, shared identification information such as a shared number, the user ID, and the printer ID are associated with each other. A printer ID "PRT A" corresponds to the printer A 100a, a printer ID "PRT B" corresponds to the printer B 100b, and the printer ID "PRT C" corresponds to the printer C 100c. In the example illustrated in FIG. 3, a shared number "S00001", a user ID "USR00001", and the printer ID "PRT A" are associated with each other.

FIG. 4 illustrates an example of a printing job management table.

The printing job management table 2622 stores a plurality of information items relevant to the image forming job in association for each printer. The plurality of information items relevant to the image forming job include job identification information such as a job number, an image forming job receiving time, a document name, a job status, and the user ID. Further, the plurality of information items relevant to the image forming job include a printing data storage location, a format, a color mode, and the number of manuscripts to be printed on one sheet (Nin1). Further, the plurality of information items relevant to the image forming job include information (a double-sided mode) indicating whether printing is performed on both surfaces or on one surface, information relevant to stapling, and information relevant to a punch hole.

In the example illustrated in FIG. 4, in the printer A 100a, a job number "JOB00001", a printing job receiving time "2016/03/20 15:05:41", and a document name "Printing Title 5" are stored in association. Further, in the example illustrated in FIG. 4, a job status "Temporary Stop", a user ID "USER00004", and a printing data storage location "/PRT/JOB00004/" are stored in association. Further, in the examples illustrated in FIG. 4, a format "Portable Document Format (PDF)", a color mode "Black and White", and the number of manuscripts printed on one sheet "1" are stored in association. Further, in the examples illustrated in FIG. 4, information indicating whether the printing is performed on both surfaces or on one surface "One Surface", information relevant to stapling "Absent", and information relevant to a punch hole "Absent" are stored in association.

FIG. 5 illustrates an example of a printer information management table.

In the printer information management table 2623, a printer ID, a printer name, an installation location, a printer status, a color mode, a double-sided mode, information relevant to stapling, and information relevant to a punch hole are associated with each other.

In the example illustrated in FIG. 5, a printer ID "PRT A", a printer name "Shared Printer A", an installation location "Office A", and a printer status "Online" are associated with each other. Further, in the example illustrated in FIG. 5, a color mode "Black and White", a double-sided mode "Both Surfaces", information relevant to stapling "Present", and information relevant to a punch hole "Absent" are associated with each other.

FIG. 6 illustrates an example of a user management table.

In the user management table 2624, a user ID and a user name are associated with each other.

In the example illustrated in FIG. 6, a user ID "USER00001" and a user name "User A" are associated with each other.

The printing data 2625 stores the printing data which is received from the terminal device.

The printing setting information 2626 is information which is set with respect to the processing of the image forming job. Specifically, the printing setting information 2626 includes a document name, a printing language, a format, a color mode, the number of copies, a double-sided mode, an Nin1 mode, a user ID, the presence or absence and the position of stapling, the presence or absence and the position of a punch hole, and the like.

Background Printing Processing

Figure 7A:
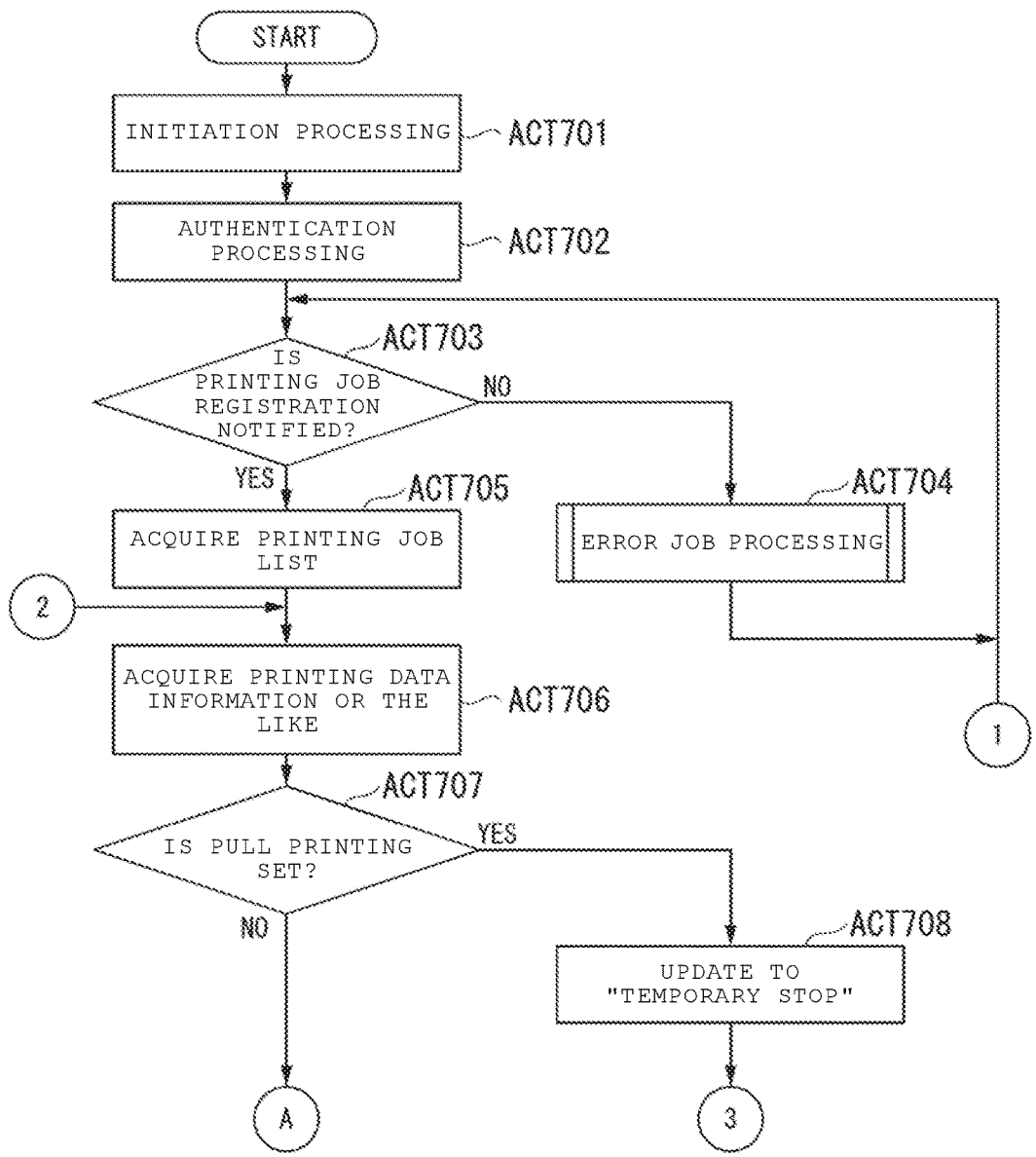
FIGS. 7A and 7B are flowcharts illustrating a first example sequence of operations of the shared printer system.
Figure 7B:
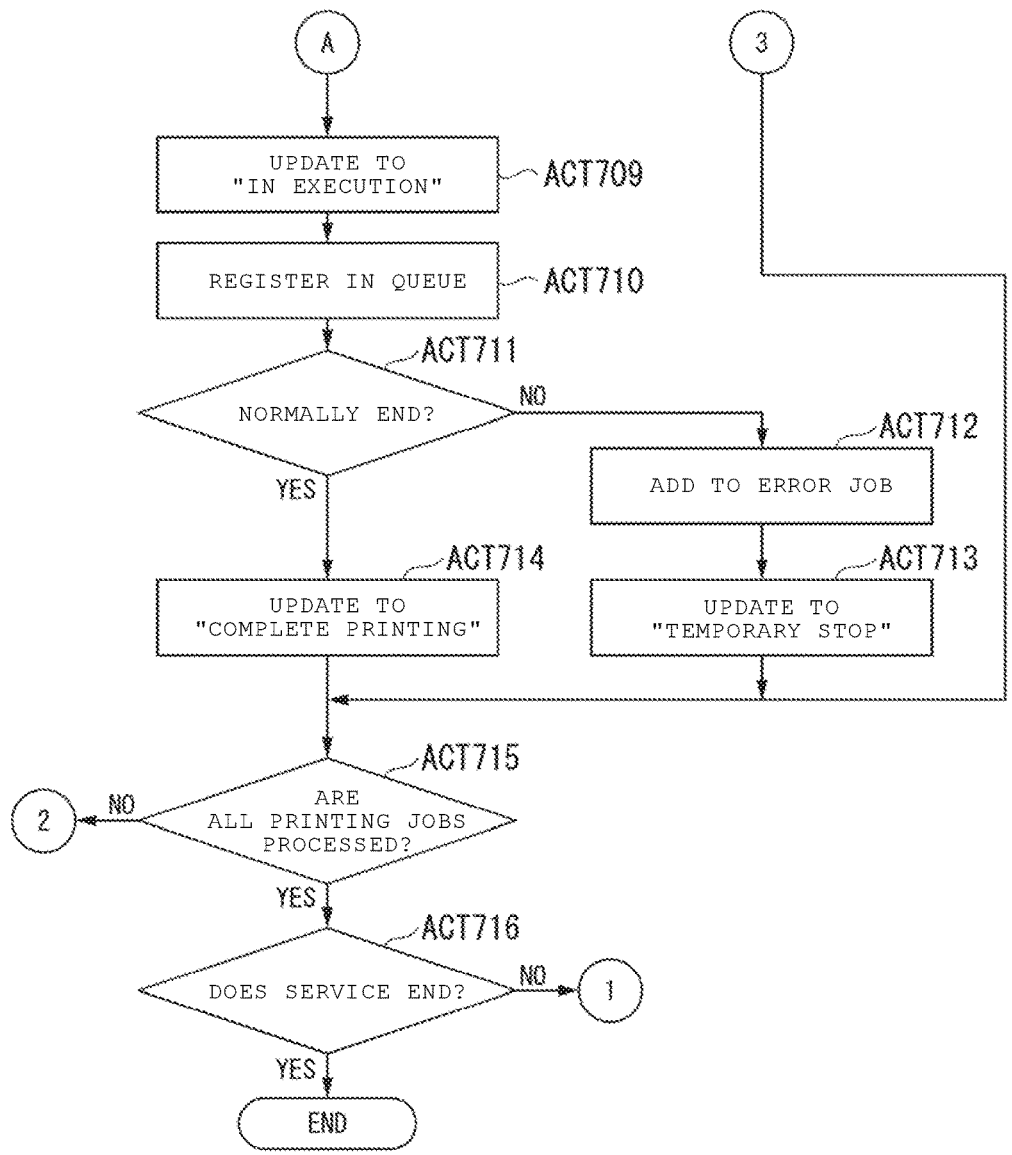

FIG. 7A and FIG. 7B are flowcharts illustrating an example sequence of operations of the printer of the shared printer system according to the embodiment. A control flow of background printing will be described with reference to FIG. 7A and FIG. 7B.

When the image forming job which is transmitted from the terminal device is received by the server device 200, the server device 200 registers the image forming job. The printer 100 acquires the image forming job registered in the server device 200, and automatically executes printing. In the background printing, the user is able to execute the printing without operating the printer 100.

The printing job processing unit 156 performs initiation processing (ACT701).

The authentication processing unit 154 performs authentication processing by using an access token which is acquired in a user ID of a printer manager (ACT702). When the authentication processing fails, the authentication processing unit 154 performs exception processing. Here, a case where the authentication succeeds by the authentication processing unit 154 will be continuously described.

The printing job processing unit 156 determines whether or not the image forming job registration is notified from the server device 200 (ACT703). When the image forming job registration is not notified (ACT703—NO), the printing job processing unit 156 executes error job processing (ACT704 described further below.

When the image forming job registration is notified (ACT703—YES), the printing job processing unit 156 acquires the printing job list from the server device 200 (ACT705). The printing job processing unit 156 transmits a request for a printing job list with respect to the server device 200 to the server device 200 from the transmitting and receiving unit 152. Then, the printing job processing unit 156 acquires the printing job list which is transmitted from the server device 200 in response to the request for a printing job list.

The printing job processing unit 156 analyzes the printing job list, and acquires printing setting information, a printing data storage location, and the like (ACT706). The printing job processing unit 156 selects an arbitrary image forming job from the image forming job included in the printing job list. The printing job processing unit 156 acquires printing setting information, a printing data storage location, and the like which are relevant to the image forming job.

The printing job processing unit 156 determines whether or not the printing setting information includes information indicating PULL printing (ACT707).

When the printing setting information includes the information indicating PULL printing (ACT707—YES), the printing job processing unit 156 transmits a request for updating the status of a printing job to "Temporary Stop" to the server device 200 from the transmitting and receiving unit 152. Accordingly, when the background printing is not performed by the printer 100, the printing job processing unit 156 is able to update the status of the printing job to "Temporary Stop". After the request for updating the status of the printing job to "Temporary Stop" is transmitted to the server device 200, the process proceeds to ACT715.

When the printing setting information does not include the information indicating PULL printing (ACT707—NO), the printing job processing unit 156 transmits a request for updating the status of the printing job to "in Execution" to the server device 200 from the transmitting and receiving unit 152 (ACT709).

The printing job processing unit 156 acquires printing data of the image forming job. The printing job processing unit 156 registers printing setting information and printing data of the image forming job in a queue of the printing control unit 158 (ACT710).

The printing control unit 158 determines whether or not the image forming job normally ends (ACT711).

When there is an error in the image forming job (ACT711—NO), the printing control unit 158 adds the image forming job to the error job list 1621 (ACT712).

The printing job processing unit 156 transmits a request for updating the status of the printing job to "Temporary Stop" to the server device 200 from the transmitting and receiving unit 152 (ACT713).

When the image forming job normally ends (ACT711—YES), the printing job processing unit 156 transmits a request for updating the status of the printing job to "Complete Printing" to the server device 200 from the transmitting and receiving unit 152 (ACT714).

The printing control unit 158 determines whether or not all image forming jobs are processed (ACT715).

When it is determined that all of the image forming jobs are not processed (ACT715—NO), the process returns to ACT706.

When it is determined that all of the image forming jobs are processed (ACT715—YES), the printing job processing unit 156 determines whether or not the service ends (ACT716). That is, when it is determined that all of the image forming jobs included in the job list information are processed, the printing job processing unit 156 determines whether or not the service ends.

When it is determined that the service ends (ACT716—YES), the printing job processing unit 156 ends the service.

When it is determined that the service does not end (ACT716—NO), the process returns to ACT703.

Error Job Processing

Figure 8A:
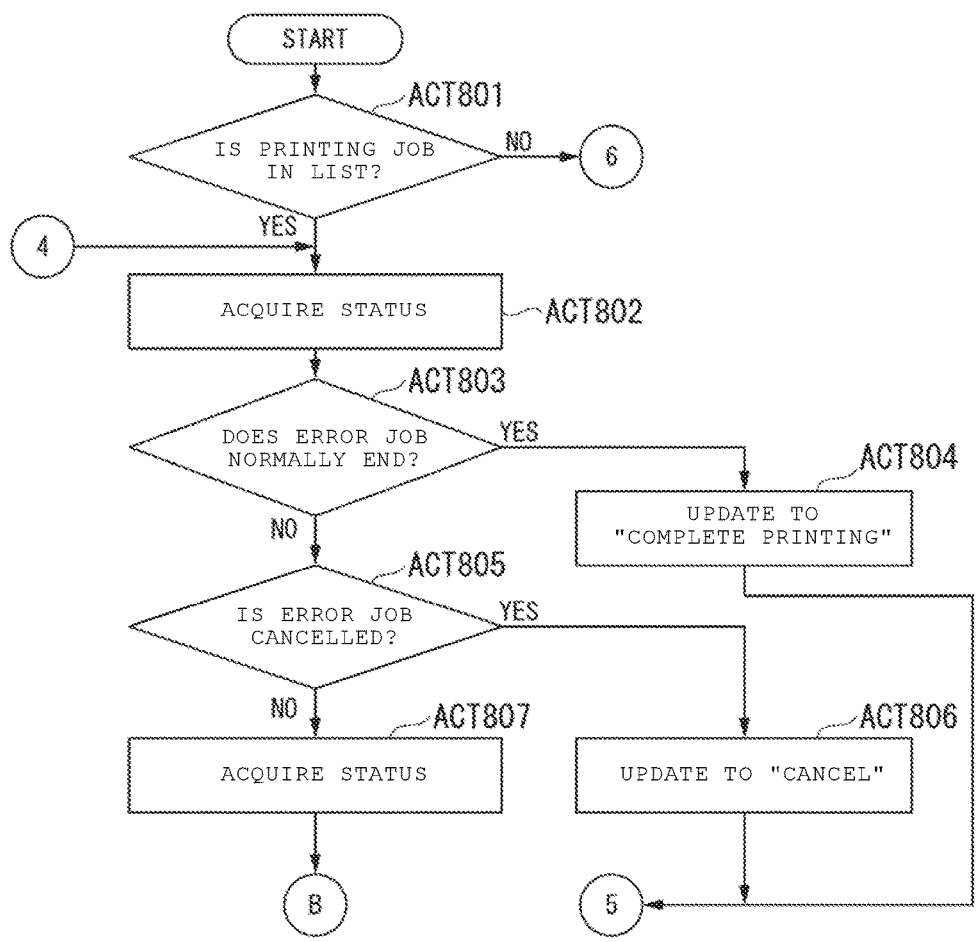
FIGS. 8A and 8B are flowcharts illustrating a second example sequence of operations of the shared printer system.
Figure 8B:
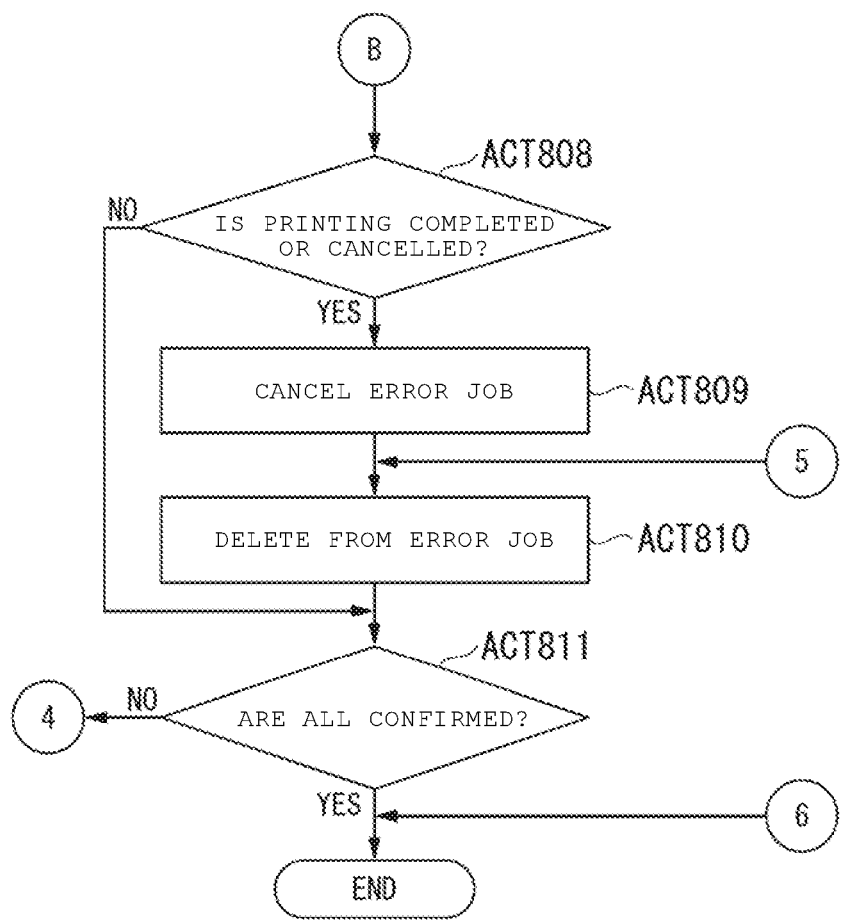

FIG. 8A and FIG. 8B are flowcharts illustrating an example sequence of operations of error job processing corresponding to ACT704 in FIG. 7. The printer 100 waits until the image forming job registration is notified from the server device 200, and performs the error job processing.

The printing job processing unit 156 determines whether or not the error job list 1621 stored in the storage unit 162 includes the image forming job (ACT801).

When it is determined that the error job list 1621 does not include the image forming job (ACT801—NO), the process ends.

When it is determined that the error job list 1621 includes the image forming job (ACT801—YES), the printing job processing unit 156 extracts an error job from the error job list 1621, and acquires the status of the printing job (ACT802).

The printing job processing unit 156 determines whether or not the error job of the printer 100 normally ends (ACT803).

When it is determined that the error job of the printer 100 normally ends (ACT803—YES), the printing job processing unit 156 transmits a request for updating the status of the printing job to "Complete Printing" to the server device 200 from the transmitting and receiving unit 152 (ACT804). After the request for updating the status of the printing job to "Complete Printing" is transmitted, the process proceeds to ACT810.

When it is determined that the error job of the printer 100 does not normally end (ACT803—NO), the printing job processing unit 156 determines whether or not the error job of the printer 100 is cancelled (ACT805).

When the error job of the printer 100 is cancelled (ACT805—YES), the printing job processing unit 156 transmits a request for updating the status of the printing job in processing to "Cancel" to the server device 200 from the transmitting and receiving unit 152 (ACT810). After the request for updating the status of the printing job to "Cancel" is transmitted, the process proceeds to ACT810.

When the error job of the printer 100 is not cancelled (ACT805—NO), the printing job processing unit 156 acquires the status of the printing job with respect to an image forming job corresponding to the error job from the server device 200 (ACT807).

The printing job processing unit 156 determines whether or not the status of the printing job acquired from the server device 200 is either "Complete Printing" or "Cancel" (ACT808). When it is determined that the status of the server device 200 is not "Complete Printing" or "Cancel" (ACT808—NO), the process proceeds to ACT811.

When it is determined that the status of the server device 200 is either "Complete Printing" or "Cancel" (ACT808—YES), the printing job processing unit 156 cancels the error job of the printer 100 (ACT809).

The printing job processing unit 156 deletes the image forming job from the error job list 1621 (ACT810).

The printing job processing unit 156 determines whether or not all of the image forming jobs included in the error job list 1621 are confirmed (ACT811). Here, the image forming job includes both of an error job occurring in the background printing and an error job occurring in the PULL printing.

When all of the image forming jobs included in the error job list 1621 are not confirmed (ACT811—NO), the process proceeds to ACT802. When all of the image forming jobs included in the error job list 1621 are confirmed (ACT811—YES), the process ends.

PULL Printing Processing

Figure 9A:
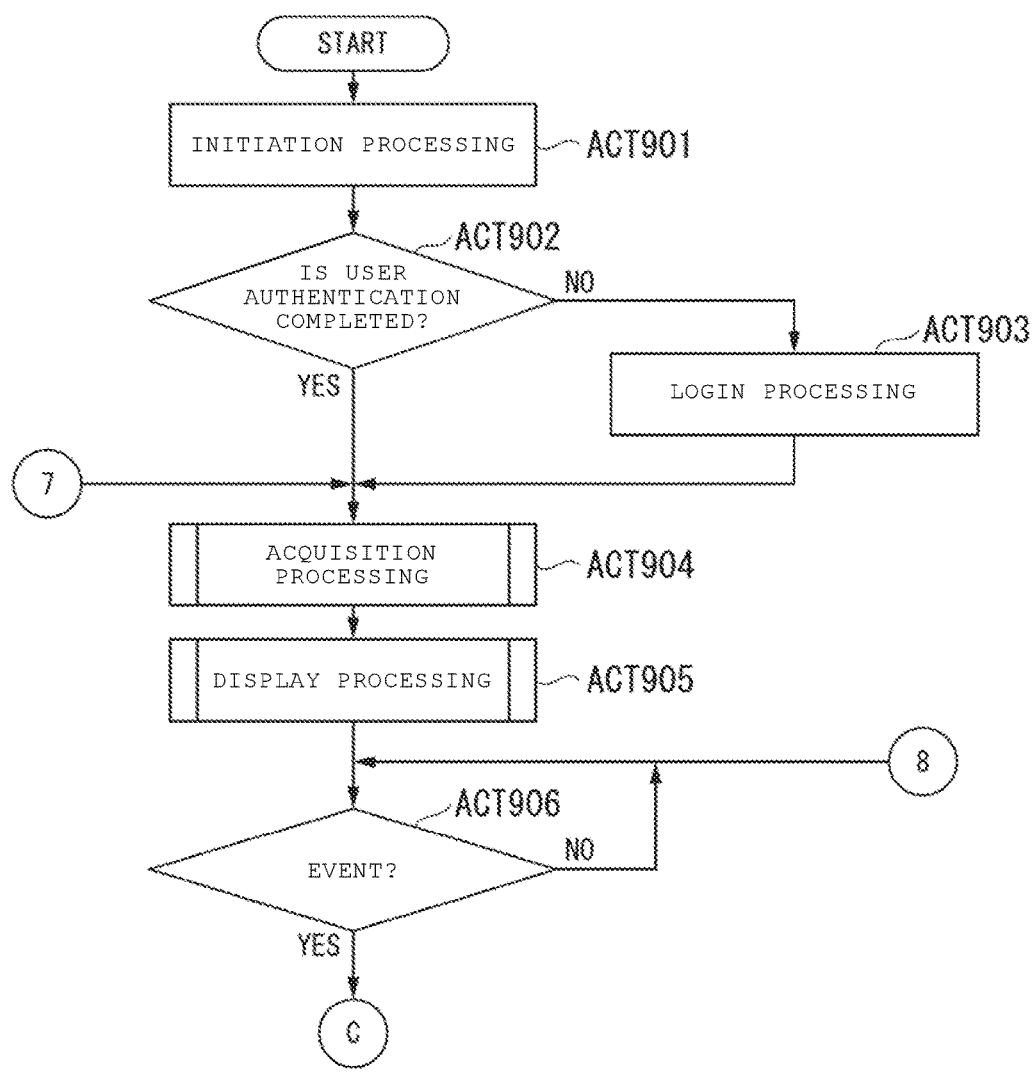
FIGS. 9A and 9B are flowcharts illustrating a third example sequence of operations of the shared printer system.
Figure 9B:
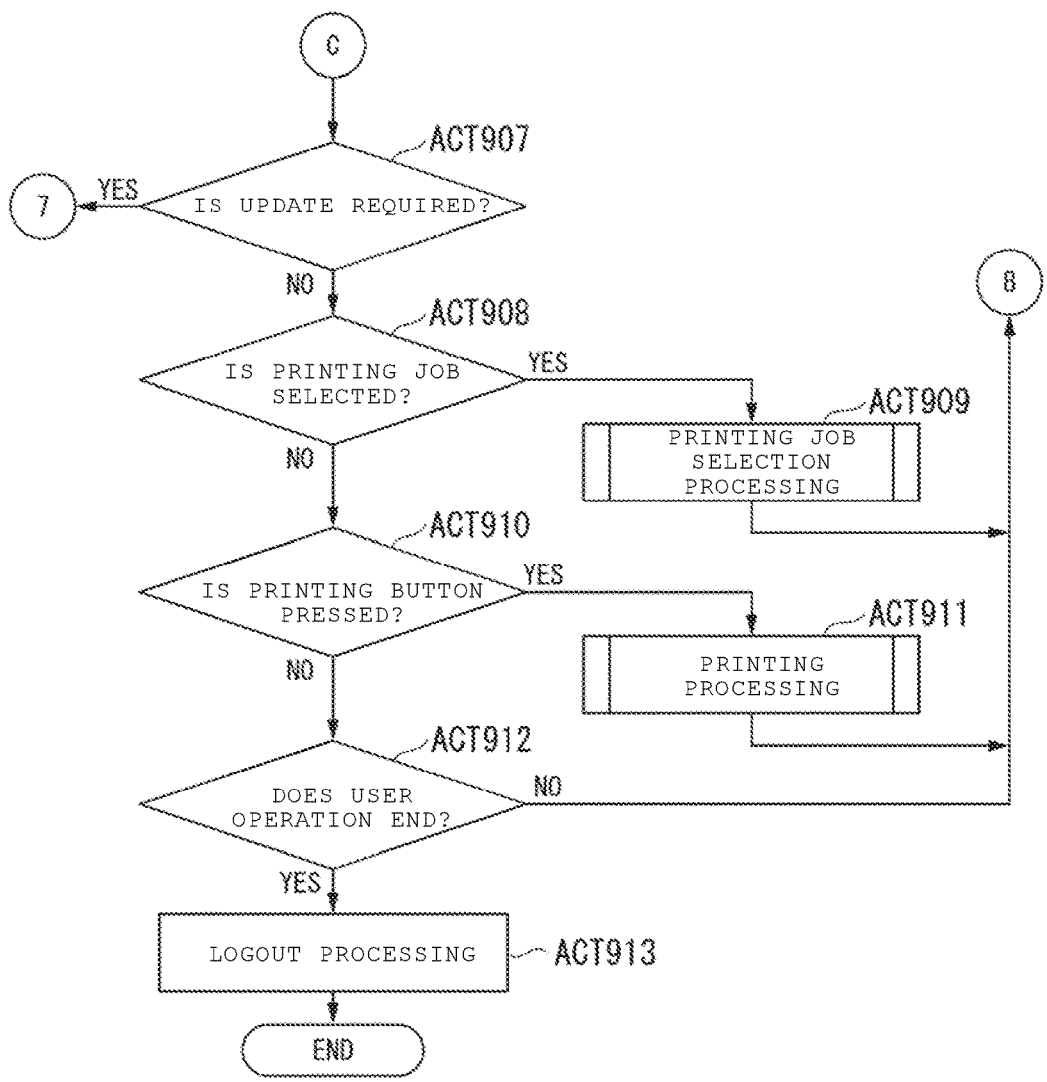

FIG. 9A and FIG. 9B are flowcharts illustrating an example sequence of operations for a control flow of the PULL printing. In the PULL printing, the user arbitrarily selects an image forming job from a list of the image forming jobs displayed on the operation panel 102 of the printer 100. The printer 100 executes the image forming job selected by the user.

The printing job processing unit 156 performs the initiation processing (ACT901).

The authentication processing unit 154 determines whether or not the authentication processing of the user is completed (ACT902). When the authentication processing is not completed (ACT902—NO), the authentication processing unit 154 requires login processing with respect to the user (ACT903). Here, a case where the login processing succeeds will be continuously described. When the login processing fails, the authentication processing unit 154 performs the exception processing.

When the authentication processing is completed (ACT902—YES), a printing job list is acquired from the server device 200 (ACT904). The printing job processing unit 156 transmits a request for a printing job list to the server device 200 from the transmitting and receiving unit 152. Then, the printing job processing unit 156 acquires the printing job list which is transmitted from the server device 200 with respect to the request for a printing job list.

The display control unit 160 displays the printing job list acquired by the printing job processing unit 156 on the operation panel 102 (ACT905).

The display control unit 160 determines whether or not there is an event from the operation panel 102 (ACT906). When there is no event from the operation panel 102, the process returns to ACT906.

When there is an event from the operation panel 102 (ACT906—YES), the printing job processing unit 156 determines whether or not where there is a request for updating the printing job list (ACT907). When there is a request for updating the printing job list (ACT907—YES), the process proceeds to ACT904.

When there is no request for updating the printing job list (ACT907—NO), the printing job processing unit 156 determines whether or not the image forming job is selected (ACT908).

When it is determined that the image forming job is selected (ACT908—YES), the printing job processing unit 156 performs selection processing of the image forming job (ACT909). The selection processing of the image forming job will be described below. After the selection processing of the image forming job is performed, the process proceeds to ACT906.

When it is determined that the image forming job is not selected (ACT908—NO), the printing job processing unit 156 determines whether or not a printing button is pressed (ACT910). When it is determined that the printing button is pressed (ACT910—YES), the printing control unit 158 performs the printing processing (ACT911). The printing processing will be described below. After the printing processing is performed, the process proceeds to ACT906.

When it is determined that the printing button is not pressed (ACT910—NO), the printing control unit 158 determines whether or not the operation of the user ends (ACT912). When the operation of the user does not end (ACT912—NO), the process proceeds to ACT906.

When it is determined that the operation of the user ends (ACT912—YES), the authentication processing unit 154 performs logout processing (ACT913).

Image Forming Job List Acquisition Processing

Figure 10:
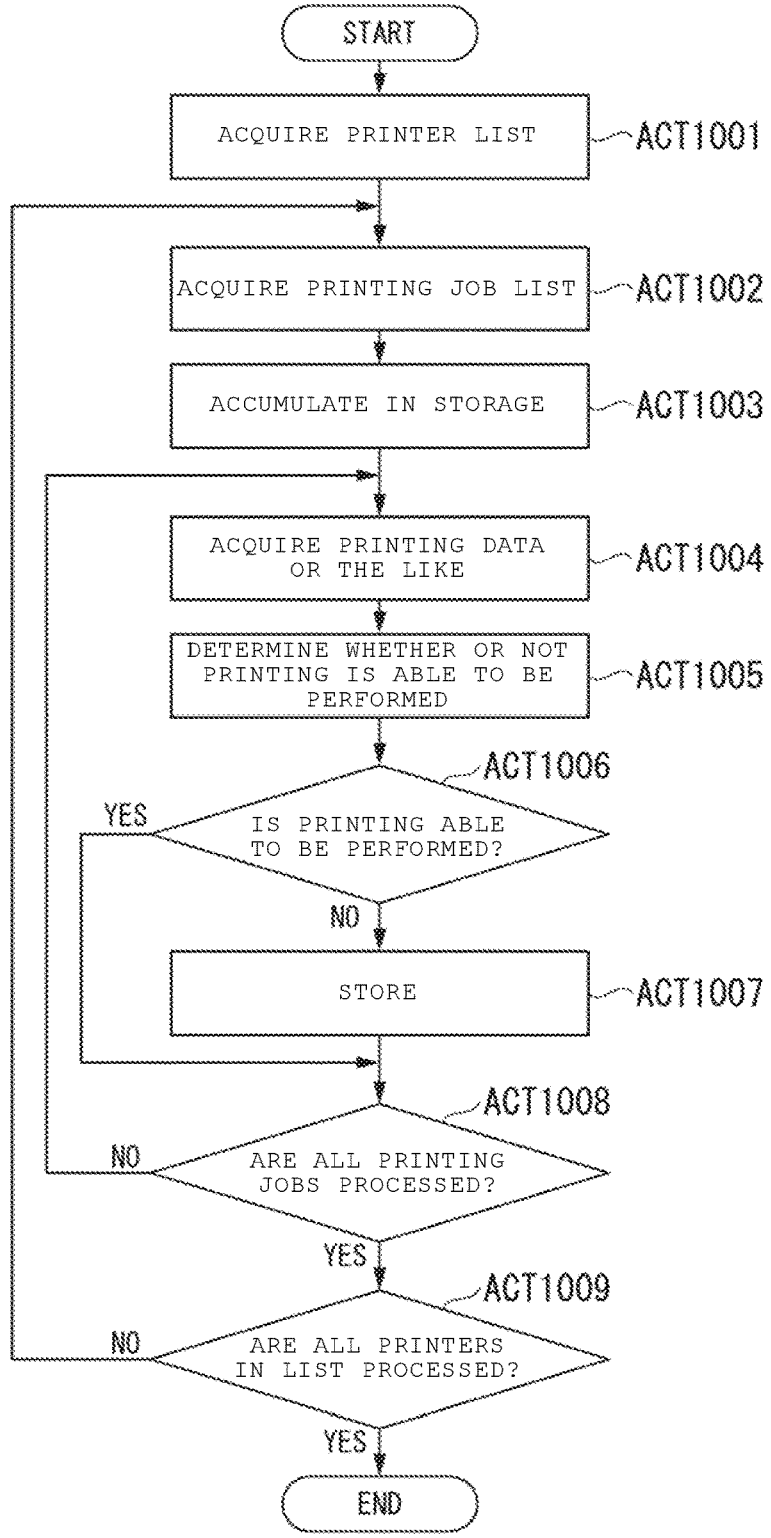
FIG. 10 is a flowchart illustrating a fourth example sequence of operations of the shared printer system.

FIG. 10 is a flowchart illustrating an example sequence of operations of printing job list acquisition processing corresponding to ACT904 in FIG. 9.

The printing job processing unit 156 acquires a list of the printers over which the user successful in the authentication has use authority by the authentication processing unit 154 (ACT1001). The printing job processing unit 156 acquires the list of the printers over which the user has use authority from the server device 200 by using a user ID which is authenticated.

The printing job processing unit 156 selects an arbitrary printer from the list of the printers, and acquires a list of printing jobs registered in the selected printer from the server device 200 (ACT1002).

The printing job processing unit 156 accumulates information of the printer selected from the list of the printers and the list of the printing jobs registered in the printer in a storage such as the storage unit 162 (ACT1003).

The printing job processing unit 156 analyzes the information of the printer accumulated in the storage unit 162 and the list of the printing jobs, and acquires information indicating a location in which printing setting information and printing data are stored (ACT1004).

The printing job processing unit 156 determines whether or not setting which is not able to correspond to the printer in processing is performed based on the printing setting information or the like (ACT1005). For example, when color printing is set with respect to a black and white printer and when hole punching is set with respect to a printer not having a hole punching function, the printing job processing unit 156 determines that setting which is not able to correspond to the printer in processing is performed.

The printing job processing unit 156 determines whether or not the image forming job is able to be printed (ACT1006).

When it is determined that the image forming job is not able to be printed (ACT1006—NO), the printing job processing unit 156 stores a printing disable flag and information indicating a cause of not enabling printing in association with the image forming job in a printing job list (ACT1007).

When the printing job processing unit 156 determines that the image forming job is able to be printed (ACT1006—YES), the process proceeds to ACT1008.

The printing job processing unit 156 determines whether or not all of the image forming jobs are processed (ACT1008). The printing job processing unit 156 executes the image forming job with respect to all of the printing job lists of the printer included in the printer list information.

When it is determined that all of the image forming jobs are not processed (ACT1008—NO), the process returns to ACT1004.

When it is determined that all of the image forming jobs are processed (ACT1008—YES), the printing job processing unit 156 determines whether or not the image forming job is processed with respect to all of the printers included in the printer list (ACT1009).

When it is determined that the image forming job is not processed with respect to all of the printers included in the printer list (ACT1009—NO), the process returns to ACT1002.

When it is determined that the image forming job is processed with respect to all of the printers included in the printer list (ACT1009—YES), the process ends.

Display Processing of Printing Job List

Figure 11:
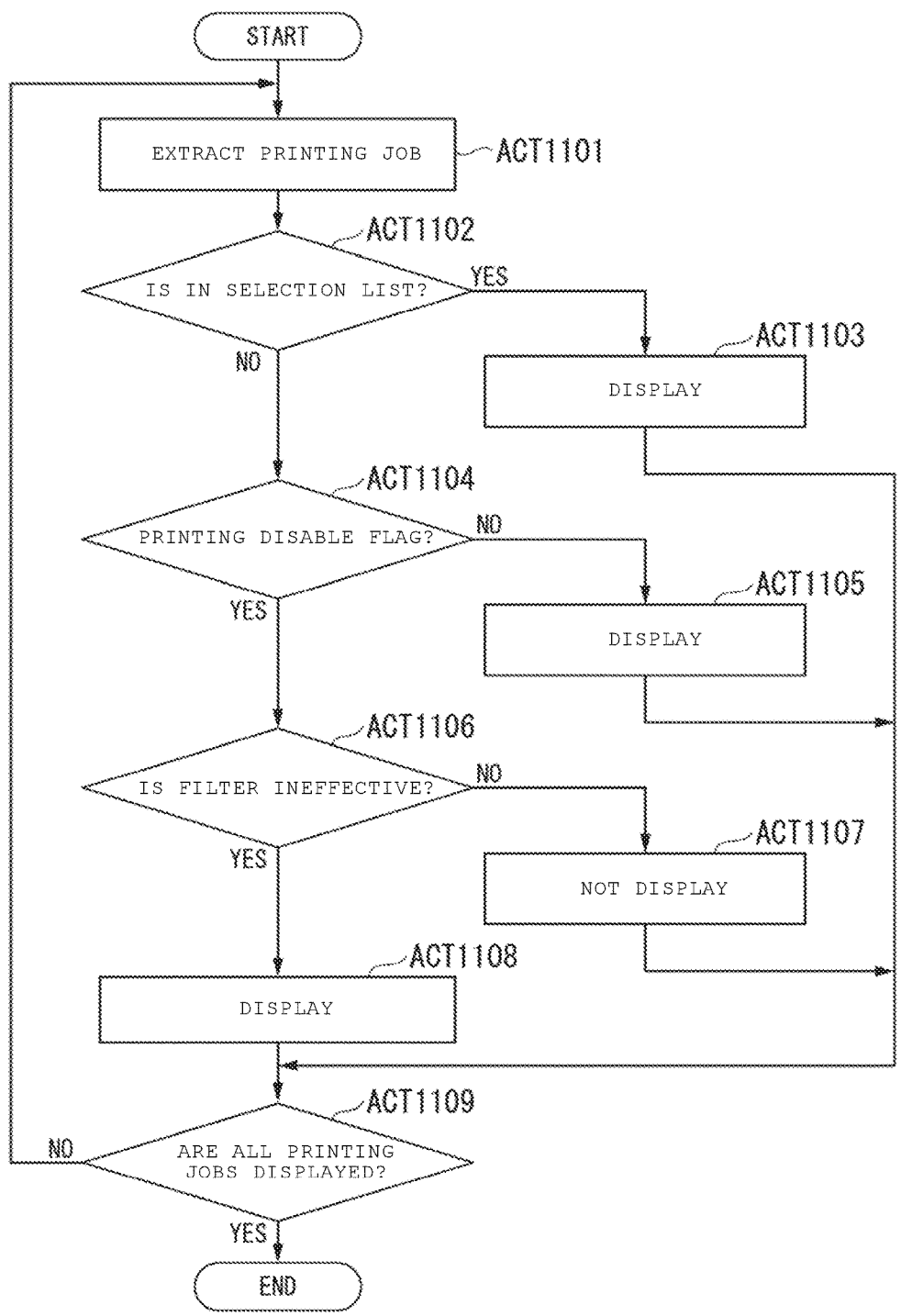
FIG. 11 is a flowchart illustrating a fifth example sequence of operations of the shared printer system.

FIG. 11 is a flowchart illustrating an example sequence of operations of display processing of the printing job list corresponding to ACT905 in FIG. 9.

The printing job processing unit 156 extracts the image forming job displayed on the page from the printing job list (ACT1101).

The printing job processing unit 156 determines whether or not the image forming job extracted in ACT1101 is included in a selection list (ACT1102). When the image forming job is included in the selection list, the image forming job is in a selected state.

When the image forming job is included in the selection list (ACT1102—YES), the display control unit 160 displays the image forming job such that it is found whether the image forming job is in a printing enable state or in a selected state (ACT1103). For example, the display control unit 160 performs reverse display with respect to the image forming job in the selected state.

When the image forming job is not included in the selection list (ACT1102—NO), the printing job processing unit 156 determines whether or not the printing disable flag is set (ACT1104).

When the printing disable flag is not set (ACT1104—NO), the display control unit 160 displays the image forming job such that it is found whether the image forming job is in the printing enable state or in an unselected state (ACT1105). For example, the display control unit 160 performs non-reverse display with respect to the image forming job in the unselected state.

When the printing disable flag is set (ACT1104—YES), the printing job processing unit 156 determines whether or not a filter is ineffective (ACT1106).

When it is determined that the filter is not ineffective (ACT1106—NO), the display control unit 160 does not display the image forming job (ACT1107).

FIG. 12 illustrates a first display example of the printing job list. In the example illustrated in FIG. 12, the printing job list includes an image forming job identification number, a document name, reception date and time, printing setting, and a shared printer name. Then, in the example illustrated in FIG. 12, the filter is effective, and thus, the image forming job in which the printing disable flag is set is not displayed.

When it is determined that the filter is ineffective (ACT1106—YES), the display control unit 160 displays the image forming job such that it is found whether or not the image forming job is in a printing disable state or in the unselected state (ACT1108).

FIG. 13 illustrates a second display example of the printing job list. In the example illustrated in FIG. 13, as in FIG. 12, the printing job list includes an image forming job identification number, a document name, reception date and time, printing setting, and a shared printer name. Then, in the example illustrated in FIG. 13, the filter is ineffective, and thus, the image forming job (printing titles 10, 9, and 3) in which the printing disable flag is set is displayed in gray.

The printing job processing unit 156 determines whether or not the display control unit 160 displays all of the image forming jobs (ACT1109). When it is determined that the display control unit 160 does not display all of the image forming jobs (ACT1109—NO), the process proceeds to ACT1101.

When it is determined that the display control unit 160 displays all of the image forming jobs (ACT1109—YES), the printing job processing unit 156 ends printing job list display processing.

Here, when the printing job list is updated, the update is performed executing the printing job list acquisition processing described with reference to FIG. 10 and the printing job list display processing described with reference to FIG. 11 again.

Image Forming Job Selection Processing

Figure 14:
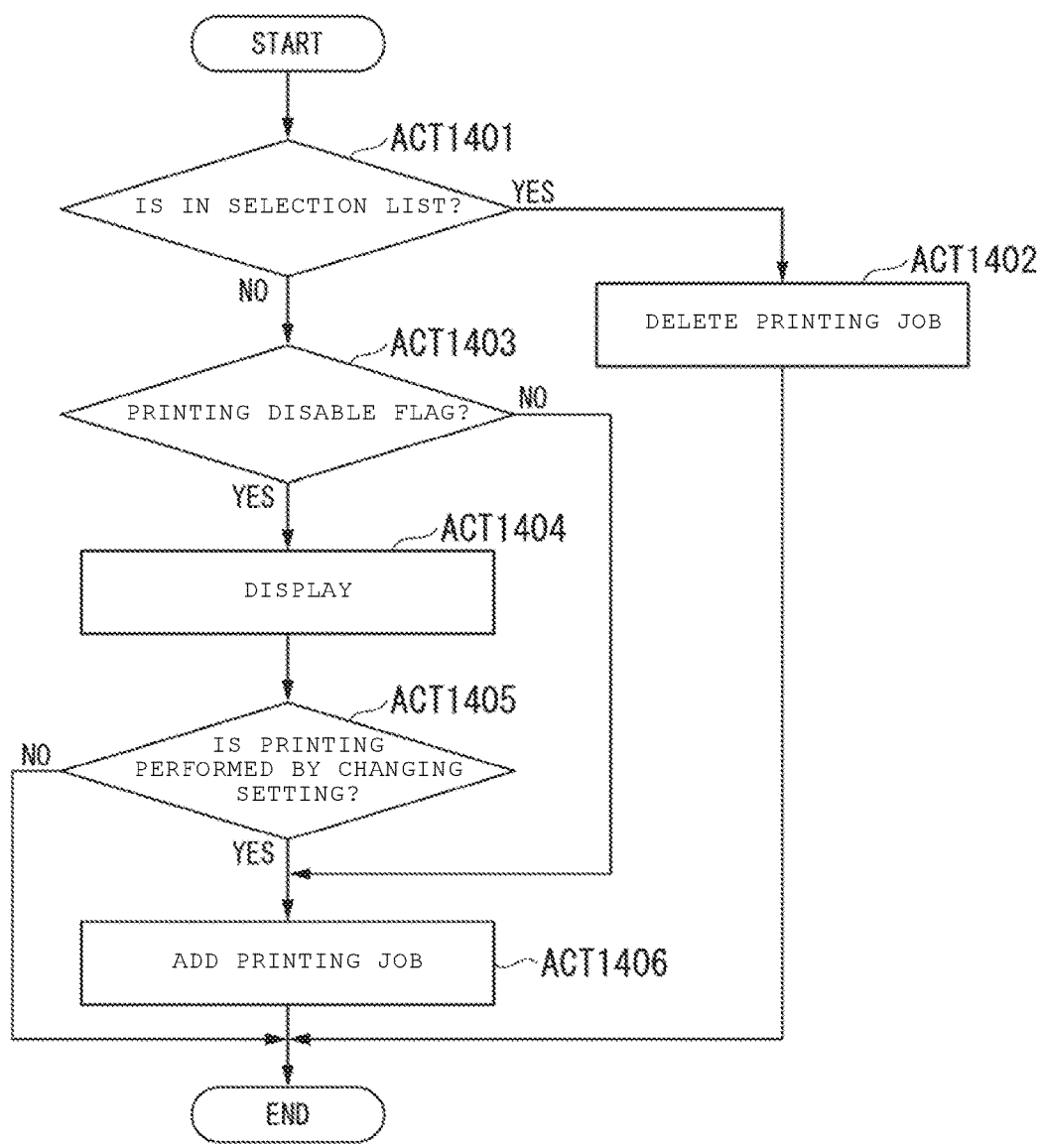
FIG. 14 is a flowchart illustrating a sixth example sequence of operations of the shared printer system.

FIG. 14 is a flowchart illustrating an example sequence of operations of image forming job selection processing corresponding to ACT909 in FIG. 9. The user touches an image forming job section displayed on the operation panel 102, and thus, the selected state and the unselected state are able to be switched to each other. Whether the image forming job is in the selected state or in the unselected state is managed by using the selection list described above.

The printing job processing unit 156 determines whether or not the image forming job selected by the user is included in the selection list (ACT1401).

When the image forming job is included in the selection list (ACT1401—YES), the printing job processing unit 156 deletes the image forming job from the selection list (ACT1402).

When the image forming job is not included in the selection list (ACT1401—NO), the printing job processing unit 156 determines whether or not a printing disable flag is set in the image forming job (ACT1403).

When the printing disable flag is not set in the image forming job (ACT1403: NO), the process proceeds to ACT1406.

When the printing disable flag is set in the image forming job (ACT1403: YES), the display control unit 160 displays a warning screen including a cause of not enabling printing and printing setting changed such that printing is able to be performed (ACT1404).

Figure 15:
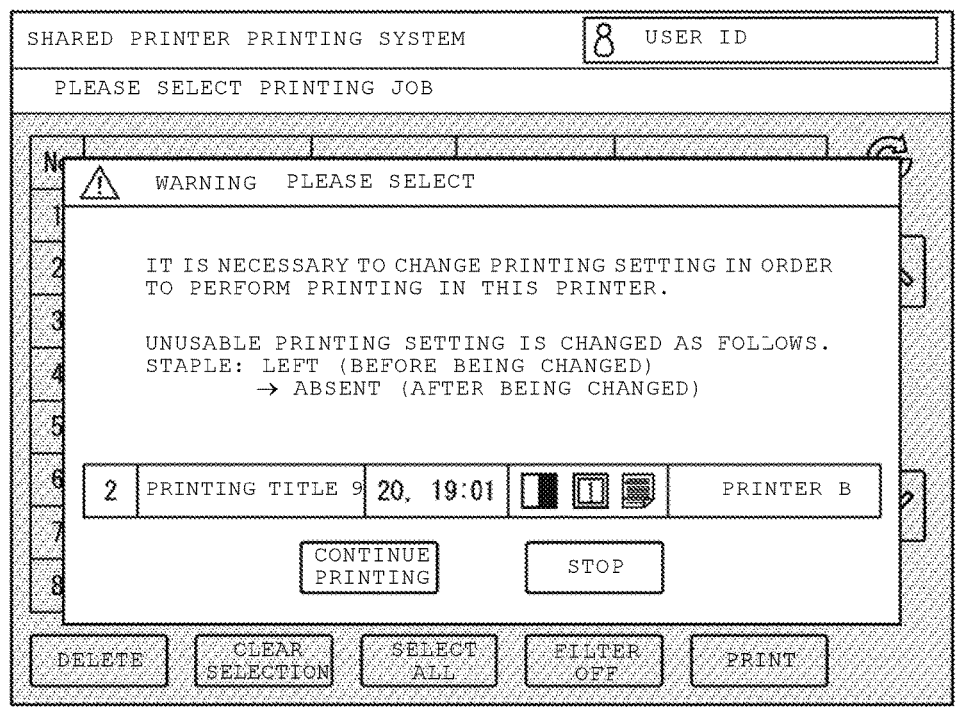
FIG. 15 is a display example of a warning screen displayed on the operation panel of the printer.

FIG. 15 illustrates a display example of the warning screen. When printing that satisfies printing setting relevant to the image forming job is not able to be executed in a printer in operation, the display control unit 160 displays the warning screen. In the example illustrated in FIG. 15, "Staple: Left (before being Changed)" indicating that stapling is performed on a left side is displayed as the cause of not enabling printing. Then, "Absent (after being Changed)" indicating that stapling is not performed is displayed as the printing setting changed such that printing is able to be performed.

The printing job processing unit 156 confirms whether or not the printing is performed by changing the printing setting (ACT1405). The user confirms the printing setting which is displayed on the warning screen, and presses a "Continue Printing" button at the time of accepting printing execution in the changed printing setting. In contrast, the user presses a "Stop" button at the time of not accepting the printing execution in the changed printing setting.

When the printing is performed by changing the printing setting (ACT1405—YES), the printing job processing unit 156 adds the image forming job to the selection list (ACT1406). Accordingly, the image forming job is in the selected state.

When the printing is not performed by changing the printing setting (ACT1405—NO), the process ends.

Printing Processing

Figure 16:
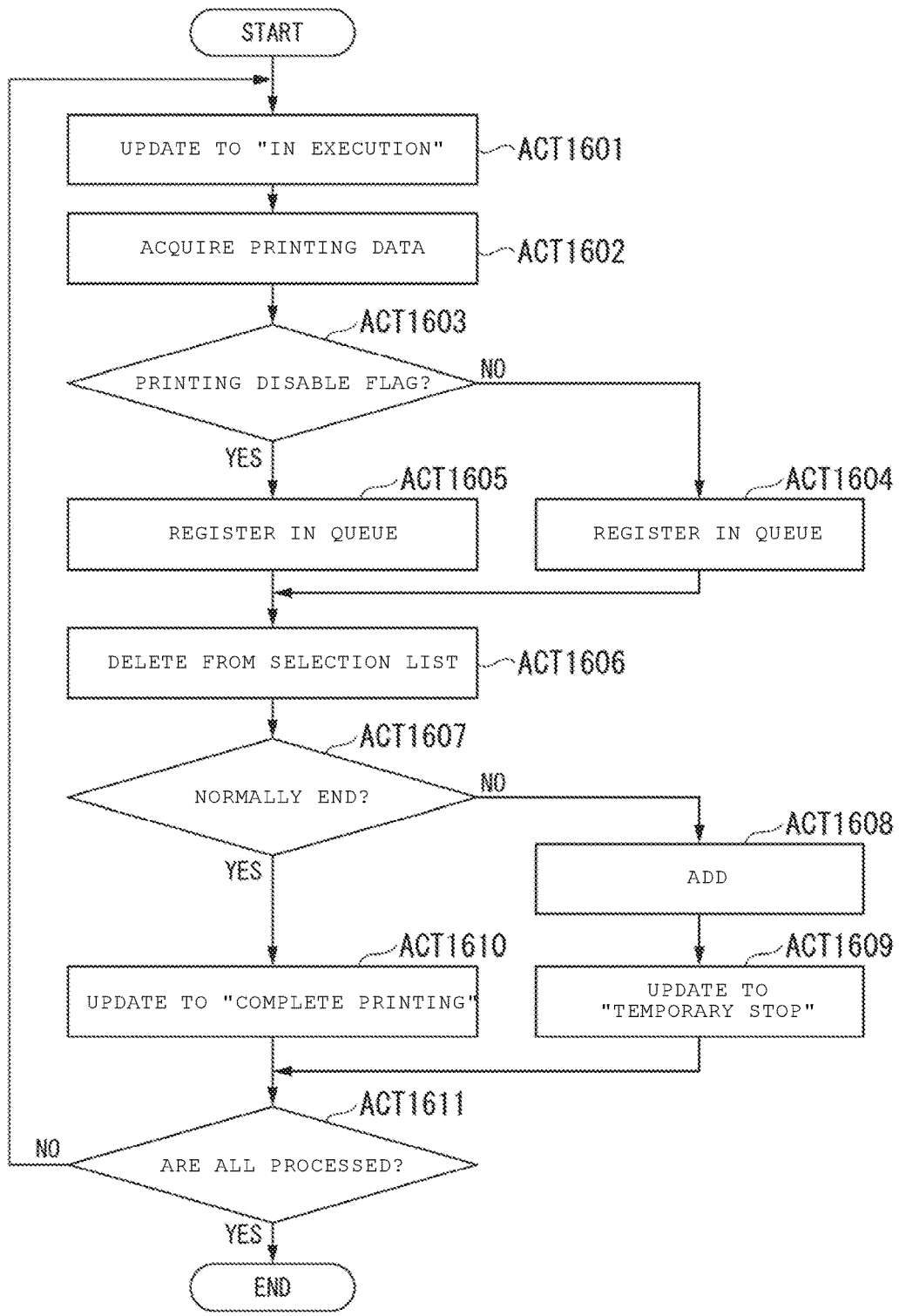
FIG. 16 is a flowchart illustrating a seventh example sequence of operations of the shared printer system.

FIG. 16 is a flowchart illustrating an example sequence of operations of printing processing corresponding to ACT911 in FIG. 9.

The printing job processing unit 156 extracts an image forming job from the head of the selection list. The printing job processing unit 156 transmits a request for updating the status of the image forming job to "in Execution" to the server device 200 (ACT1601).

The printing control unit 158 acquires printing data of the image forming job from the printing data storage location of the server device 200 (ACT1602).

The printing control unit 158 determines whether or not a printing disable flag is set in the image forming job (ACT1603).

When the printing disable flag is set (ACT1603—YES), the printing job processing unit 156 registers printing setting information which is changed such that printing is able to be performed and the printing data in the queue of the printing control unit 158 (ACT1604).

When the printing disable flag is not set (ACT1603—NO), the printing job processing unit 156 registers the printing setting information and the printing data in the queue of the printing control unit 158 (ACT1605).

The printing job processing unit 156 deletes the processed image forming job from the selection list (ACT1606).

The printing job processing unit 156 determines whether or not the image forming job normally ends (ACT1607).

When the image forming job does not normally end (ACT1607—NO), the printing control unit 158 adds the image forming job to the error job list 1621 (ACT1608).

The printing job processing unit 156 transmits a request for updating the status of the printing job to "Temporary Stop" to the server device 200 from the transmitting and receiving unit 152 (ACT1609).

In contrast, when the image forming job normally ends (ACT1607—YES), the printing job processing unit 156 transmits a request for updating the status of the printing job to "Complete Printing" to the server device 200 from the transmitting and receiving unit 152 (ACT1610).

The printing control unit 158 determines whether or not all of the image forming jobs included in the selection list are processed (ACT1611).

When it is determined that all of the image forming jobs are not processed (ACT1611—NO), the process returns to ACT1601.

When it is determined that all of the image forming jobs are processed (ACT1611—YES), the printing job processing unit 156 ends the service.

Server Device

Figure 17:
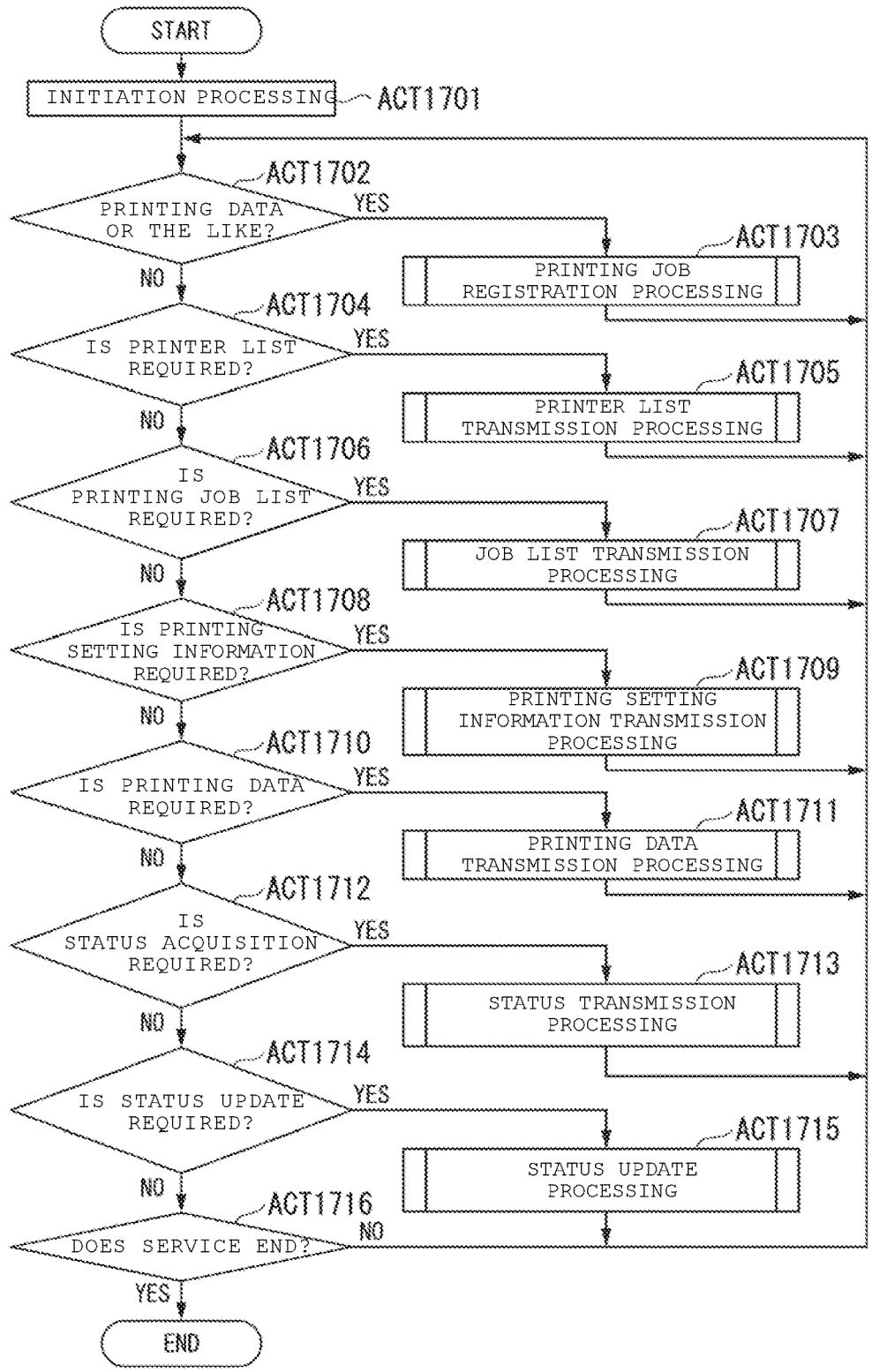
FIG. 17 is a flowchart illustrating an eighth example sequence of operations of the shared printer system.

FIG. 17 is a flowchart illustrating an example sequence of operations of the server device according to the embodiment.

The printing job processing unit 256 performs the initiation processing (ACT1701).

The printing job processing unit 256 determines whether or not printing data or the like is received from the terminal device or the like (ACT1702).

When the printing data or the like is received from the terminal device or the like (ACT1702—YES), the printing job processing unit 256 performs image forming job registration processing (ACT1703). The image forming job registration processing will be described below. After the image forming job registration processing ends, the process proceeds to ACT1702.

When the printing data or the like is not received from the terminal device or the like (ACT1702—NO), the printing job processing unit 256 determines whether or not a request for a printer list is received from the printer 100 (ACT1704).

When the request for a printer list is received from the printer 100 (1704—YES), the printing job processing unit 256 performs printer list transmission processing (ACT1705). The printer list transmission processing will be described below. After the printer list transmission processing ends, the process proceeds to ACT1702.

When the request for a printer list is not received from the printer 100 (1704—NO), the printing job processing unit 256 determines whether or not a request for a printing job list is received from the printer 100 (ACT1706).

When the request for a printing job list is received from the printer 100 (1706—YES), the printing job processing unit 256 performs printing job list transmission processing (ACT1707). The printing job list transmission processing will be described below. After the printing job list transmission processing ends, the process proceeds to ACT1702.

When the request for a printing job list is not received from the printer 100 (1706—NO), the printing job processing unit 256 determines whether or not a request for printing setting information is received from the printer 100 (ACT1708).

When the request for printing setting information is received from the printer 100 (1708—YES), the printing job processing unit 256 performs printing setting information transmission processing (ACT1709). The printing setting information transmission processing will be described below. After the printing setting information transmission processing ends, the process proceeds to ACT1702.

When the request for printing setting information is not received from the printer 100 (1708—NO), the printing job processing unit 256 determines whether or not a request for printing data is received from the printer 100 (ACT1710).

When the request for printing data is received from the printer 100 (1710—YES), the printing job processing unit 256 performs printing data transmission processing (ACT1711). The printing data transmission processing will be described below. After the printing data transmission processing ends, the process proceeds to ACT1702.

When the request for printing data is not received from the printer 100 (1710—NO), the printing job processing unit 256 determines whether or not a request for acquiring a status of a printing job is received from the printer 100 (ACT1712).

When the request for acquiring a status of a printing job is received from the printer 100 (1712—YES), the printing job processing unit 256 performs printing job status transmission processing (ACT1713). The printing job status transmission processing will be described below. After the printing job status transmission processing ends, the process proceeds to ACT1702.

When the request for transmitting a status of a printing job is not received from the printer 100 (1712—NO), the printing job processing unit 256 determines whether or not a request for updating the status of the printing job is received from the printer 100 (ACT1714).

When the request for updating the status of the printing job is received from the printer 100 (1714—YES), the update unit 258 performs printing job status update processing (ACT1715). The printing job status update processing will be described below. After the printing job status update processing ends, the process proceeds to ACT1702.

When the request for updating the status of the printing job is not received from the printer 100 (1714—NO), the printing job processing unit 256 determines whether or not the service ends (ACT1716).

When it is determined that the service does not end (ACT1716—NO), the process proceeds to ACT1702. When it is determined that the service ends (ACT1716—YES), the process ends.

Image Forming Job Registration Processing

Figure 18:
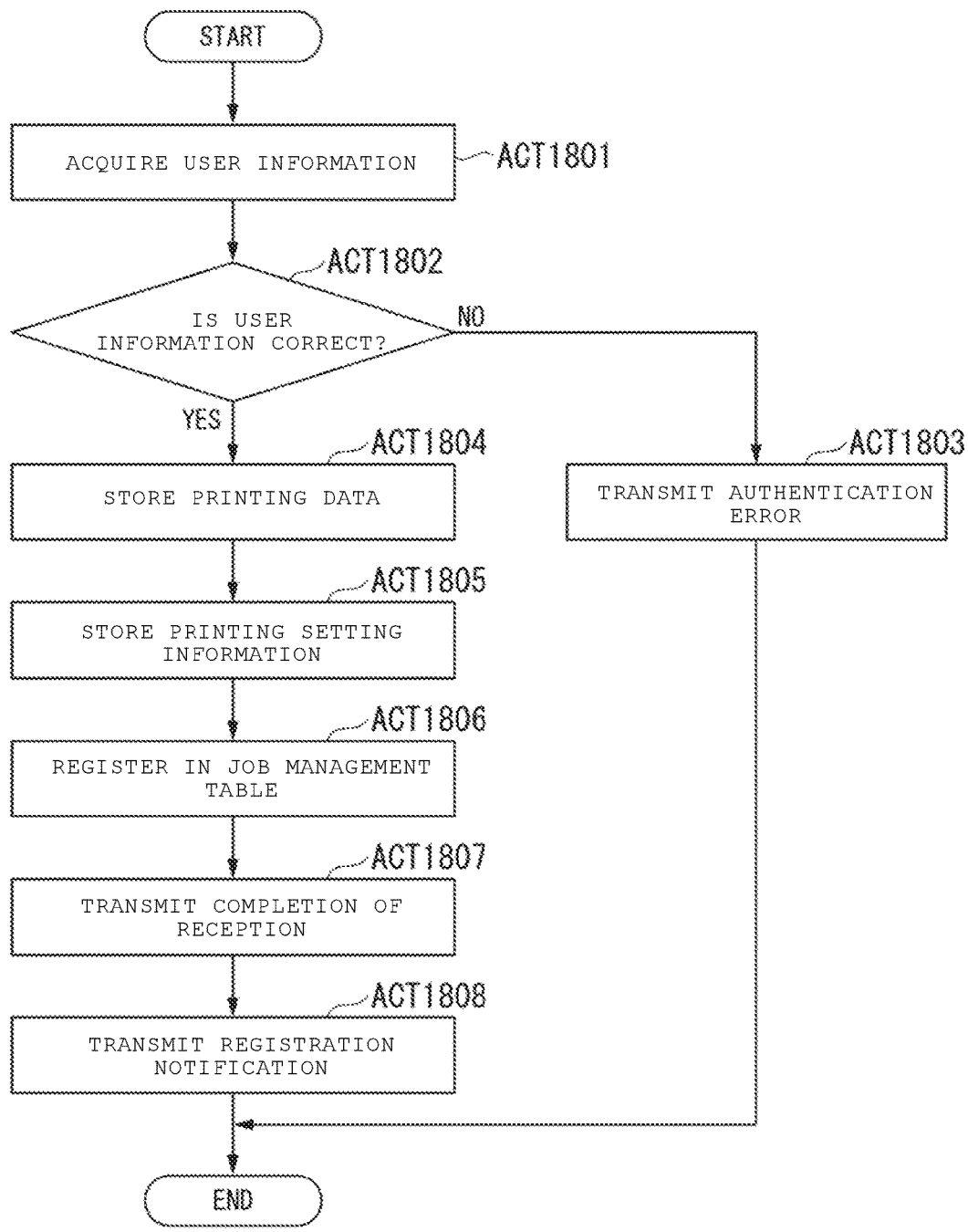
FIG. 18 is a flowchart illustrating a ninth example sequence of operations of the shared printer system.

FIG. 18 is a flowchart illustrating an example sequence of operations of image forming job registration processing corresponding to ACT1703 in FIG. 17.

The authentication processing unit 254 acquires user information which is transmitted from the terminal device from the transmitting and receiving unit 252 (ACT1801). The user information which is transmitted from the terminal device is, for example, an HTTP Cookie of the user successful in the authentication by the printer 100.

The authentication processing unit 254 determines whether or not the user information received from the terminal device is correct (ACT1802).

When it is determined that the user information is not correct (ACT1802—NO), the authentication processing unit 254 transmits information indicating an authentication error to the terminal device from the transmitting and receiving unit 252 (ACT1803). After the information indicating the authentication error is transmitted, the server device 200 ends the authentication job registration processing.

When it is determined that the user information is correct (ACT1802—YES), the printing job processing unit 256 stores the printing data received from the terminal device in the printing data storage location of the auxiliary storage device 205 (ACT1804). For example, the printing job processing unit 256 stores the printing data in a predetermined region of the printing data storage location. Here, the predetermined region is set in advance for each printer.

The printing job processing unit 256 analyzes the printing data, and extracts printing setting information. The printing job processing unit 256 stores the printing setting information in the predetermined region of the printing data storage location (ACT1805).

The printing job processing unit 256 registers the printing setting information, the user ID in which an image forming job is registered, a registration time, and the like in association, in the printing job management table 2622 (ACT1806).

The printing job processing unit 256 transmits a status of completing reception to the terminal device from the transmitting and receiving unit 252 (ACT1807).

The printing job processing unit 256 transmits an image forming job registration notification to a printer which becomes a target (ACT1808).

Printer List Transmission Processing

Figure 19:
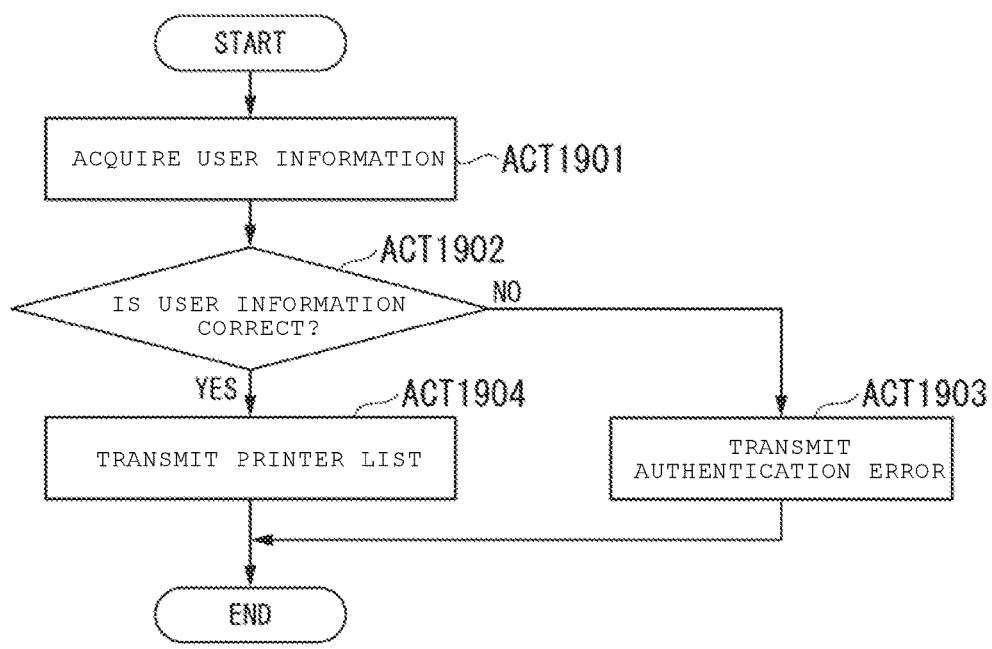
FIG. 19 is a flowchart illustrating a tenth example sequence of operations of the shared printer system.

FIG. 19 is an example sequence of operations of printer list transmission processing corresponding to ACT1705 in FIG. 17.

The authentication processing unit 254 acquires user information which is transmitted from the printer 100 from the transmitting and receiving unit 252 (ACT1901). The user information which is transmitted from the printer 100 is an HTTP Cookie of the user successful in the authentication by the printer 100.

The authentication processing unit 254 determines whether or not the user information received from the printer 100 is correct (ACT1902).

When it is determined that the user information is not correct (ACT1902—NO), the authentication processing unit 254 transmits information indicating an authentication error to the printer 100 from the transmitting and receiving unit 252 (ACT1903).

When it is determined that the user information is correct (ACT1902—YES), the printing job processing unit 256 extracts a printer over which the user has use authority from the shared printer setting management table 2621. The printing job processing unit 256 transmits printer list information including information indicating the printer which is extracted from the shared printer setting management table 2621 to the printer 100 (ACT1904).

Printing Job List Transmission Processing

Figure 20:
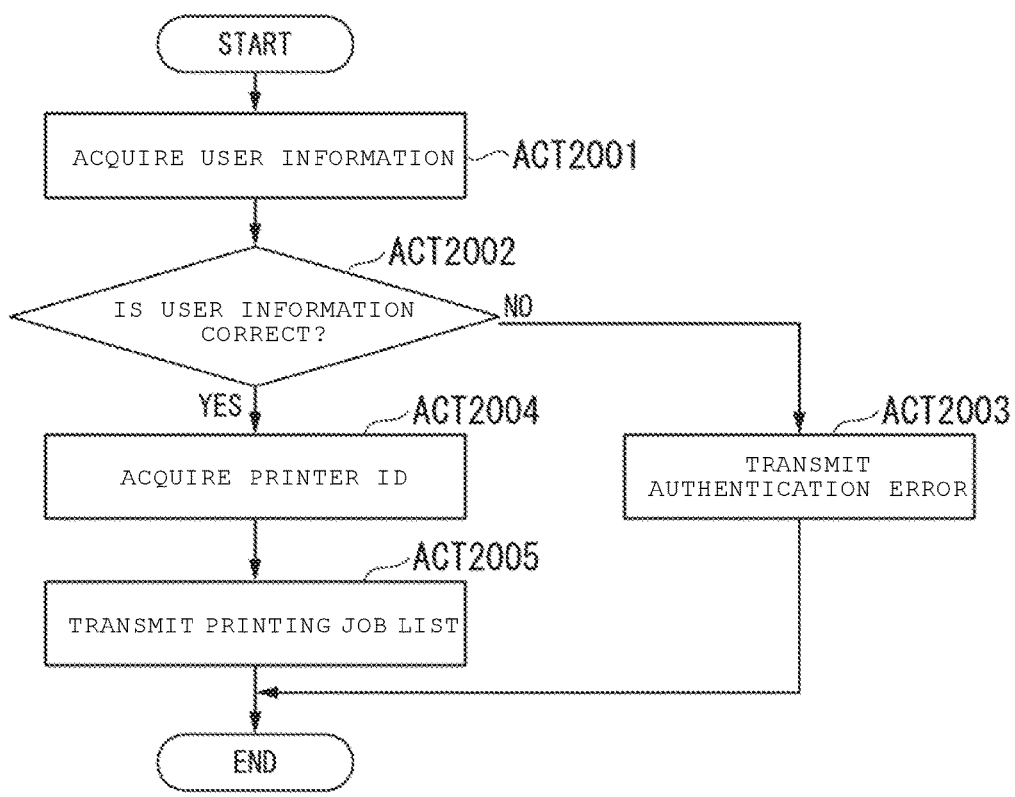
FIG. 20 is a flowchart illustrating an eleventh example sequence of operations of the shared printer system.

FIG. 20 is a flowchart illustrating an example sequence of operations of printing job list transmission processing corresponding to ACT1707 in FIG. 17.

The authentication processing unit 254 acquires user information which is transmitted from the printer 100 from the transmitting and receiving unit 252 (ACT2001). The user information which is transmitted from the printer 100 is an HTTP Cookie of the user successful in the authentication by the printer 100.

The authentication processing unit 254 determines whether or not the user information received from the printer 100 is correct (ACT2002).

When it is determined that the user information is not correct (ACT2002—NO), the authentication processing unit 254 transmits information indicating an authentication error to the printer 100 from the transmitting and receiving unit 252 (ACT2003).

When it is determined that the user information is correct (ACT2002—YES), the printing job processing unit 256 acquires a printer ID from the printer 100 (ACT2004).

The printing job processing unit 256 extracts an image forming job from the printing job management table 2622 corresponding to the printer ID. The printing job processing unit 256 transmits printing list information including the image forming job extracted from the image forming job management table 2622 to the printer 100 from the transmitting and receiving unit 252 (ACT2005).

In the flowchart illustrated in FIG. 17, the order of the processing of ACT1702, ACT1704, ACT1706, ACT1708, ACT1710, ACT1712, and ACT1714 is able to be suitably changed.

Printing Setting Transmission Processing

Figure 21:
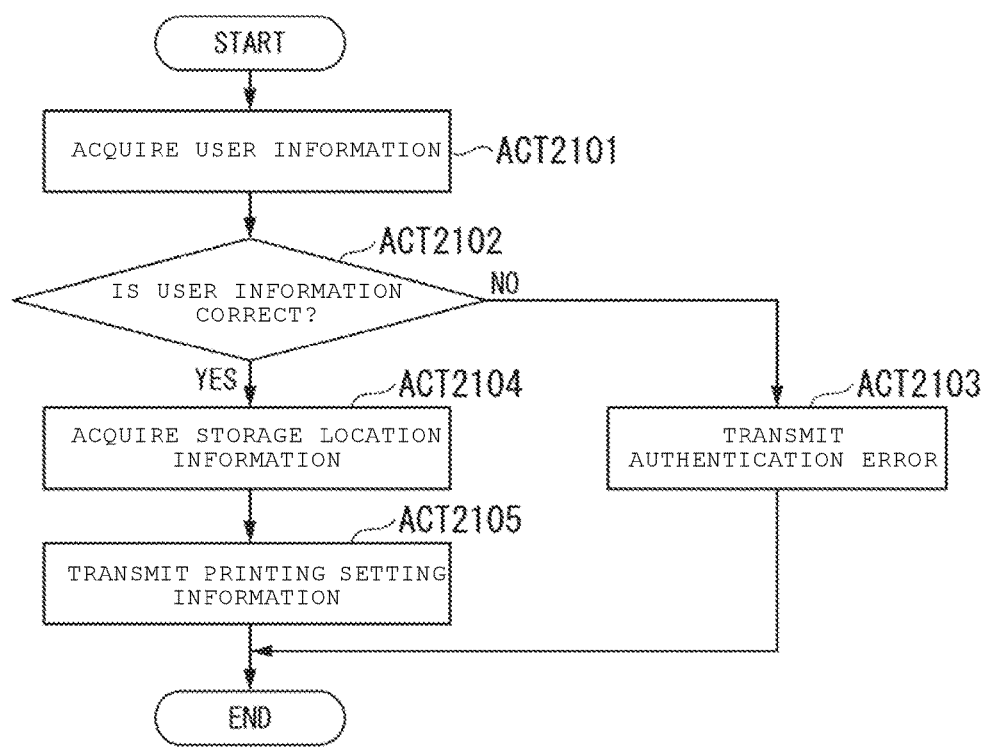
FIG. 21 is a flowchart illustrating a twelfth example sequence of operations of the shared printer system.

FIG. 21 is a flowchart illustrating an example sequence of operations of printing setting transmission processing corresponding to ACT1709 in FIG. 17.

The authentication processing unit 254 acquires user information which is transmitted from the printer from the transmitting and receiving unit 252 (ACT2101). The user information which is transmitted from the printer 100 is an HTTP Cookie of the user successful in the authentication by the printer 100.

The authentication processing unit 254 determines whether or not the user information received from the printer 100 is correct (ACT2102).

When it is determined that the user information is not correct (ACT2102—NO), the authentication processing unit 254 transmits information indicating an authentication error to the printer 100 from the transmitting and receiving unit 252 (ACT2103).

When it is determined that the user information is correct (ACT2102—YES), the printing job processing unit 256 acquires storage location information which is transmitted from the printer 100 (ACT2104).

The printing job processing unit 256 extracts printing setting information which is stored in a storage location indicated by the storage location information. The printing job processing unit 256 transmits the printing setting information which is extracted from the storage location to the printer 100 from the transmitting and receiving unit 252 (ACT2105).

Printing Data Transmission Processing

Figure 22:
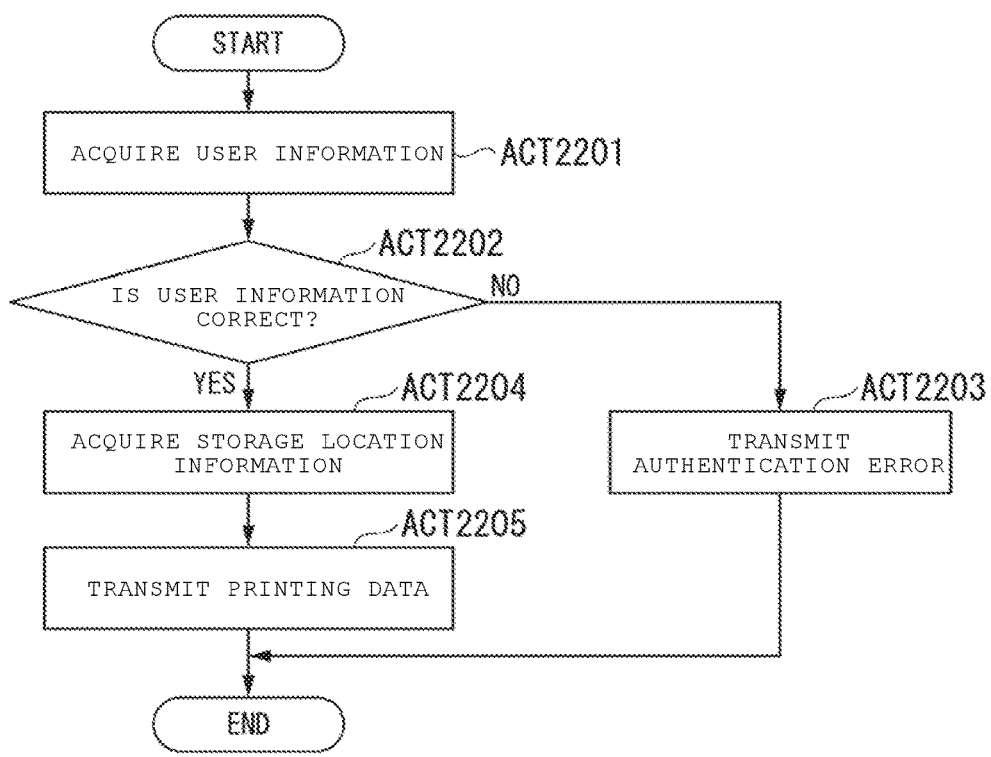
FIG. 22 is a flowchart illustrating a thirteenth example sequence of operations of the shared printer system.

FIG. 22 is a flowchart illustrating an example sequence of operations of printing data transmission processing corresponding to ACT1711 in FIG. 17.

The authentication processing unit 254 acquires user information which is transmitted from the printer 100 from the transmitting and receiving unit 252 (ACT2201). The user information which is transmitted from the printer 100 is an HTTP Cookie of the user successful in the authentication by the printer 100.

The authentication processing unit 254 determines whether or not the user information received from the printer 100 is correct (ACT2202).

When it is determined that the user information is not correct (ACT2202—NO), the authentication processing unit 254 transmits information indicating an authentication error to the printer 100 from the transmitting and receiving unit 252 (ACT2203).

When it is determined that the user information is correct (ACT2202—YES), the printing job processing unit 256 acquires storage location information which is transmitted from the printer 100 (ACT2204).

The printing job processing unit 256 extracts printing data which is stored in a location indicated by the storage location information. The printing job processing unit 256 transmits the printing data extracted from the storage location to the printer 100 from the transmitting and receiving unit 252 (ACT2205).

Printing Job Status Update Processing

Figure 23:
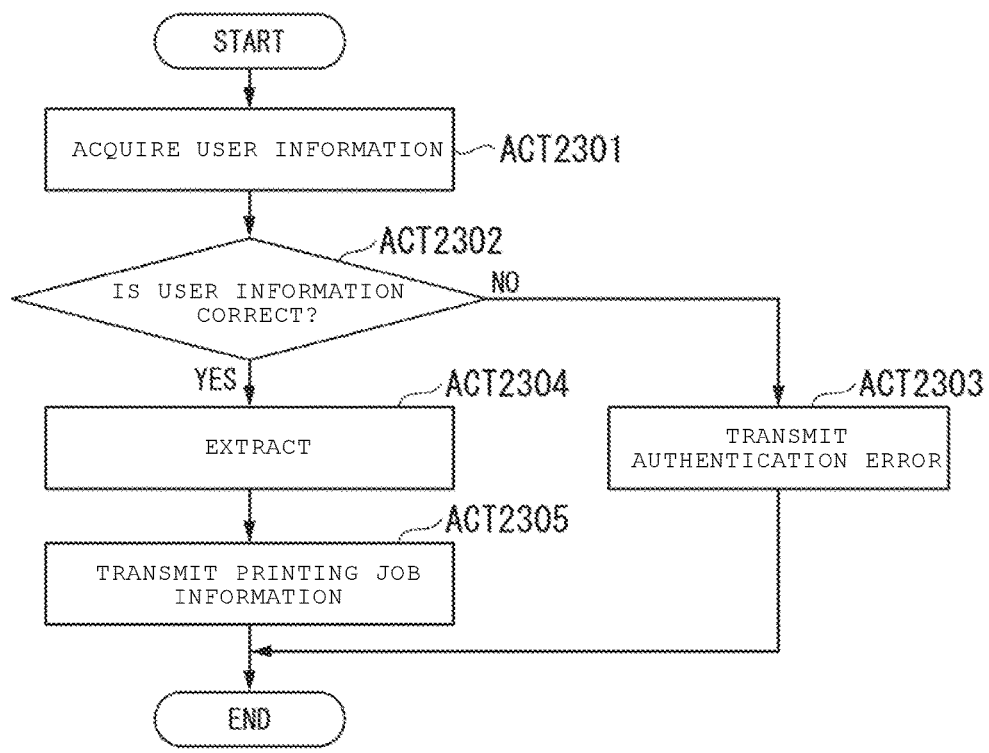
FIG. 23 is a flowchart illustrating a fourteenth example sequence of operations of the shared printer system.

FIG. 23 is an example sequence of operations of printing job status update processing corresponding to ACT1713 in FIG. 17.

The authentication processing unit 254 acquires user information which is transmitted from the printer 100 from the transmitting and receiving unit 252 (ACT2301). The user information which is transmitted from the printer 100 is an HTTP Cookie of the user successful in the authentication by the printer 100.

The authentication processing unit 254 determines whether or not the user information received from the printer is correct (ACT2302).

When it is determined that the user information is not correct (ACT2302—NO), the authentication processing unit 254 transmits information indicating an authentication error to the printer 100 from the transmitting and receiving unit 252 (ACT2303).

When it is determined that the user information is correct (ACT2302—YES), the printing job processing unit 256 acquires a printer ID and a job number which are transmitted from the printer 100 (ACT2304).

The printing job processing unit 256 acquires a printing job corresponding to the printer ID from the printing job management table 2622. The printing job processing unit 256 extracts job status information corresponding to the job number which is acquired from the printer 100 from the job numbers included in the printing job management table corresponding to the printer ID. The printing job processing unit 256 transmits the job status information to the printer 100 from the transmitting and receiving unit 252 (ACT2305).

Printing Job Status Update Processing

Figure 24:
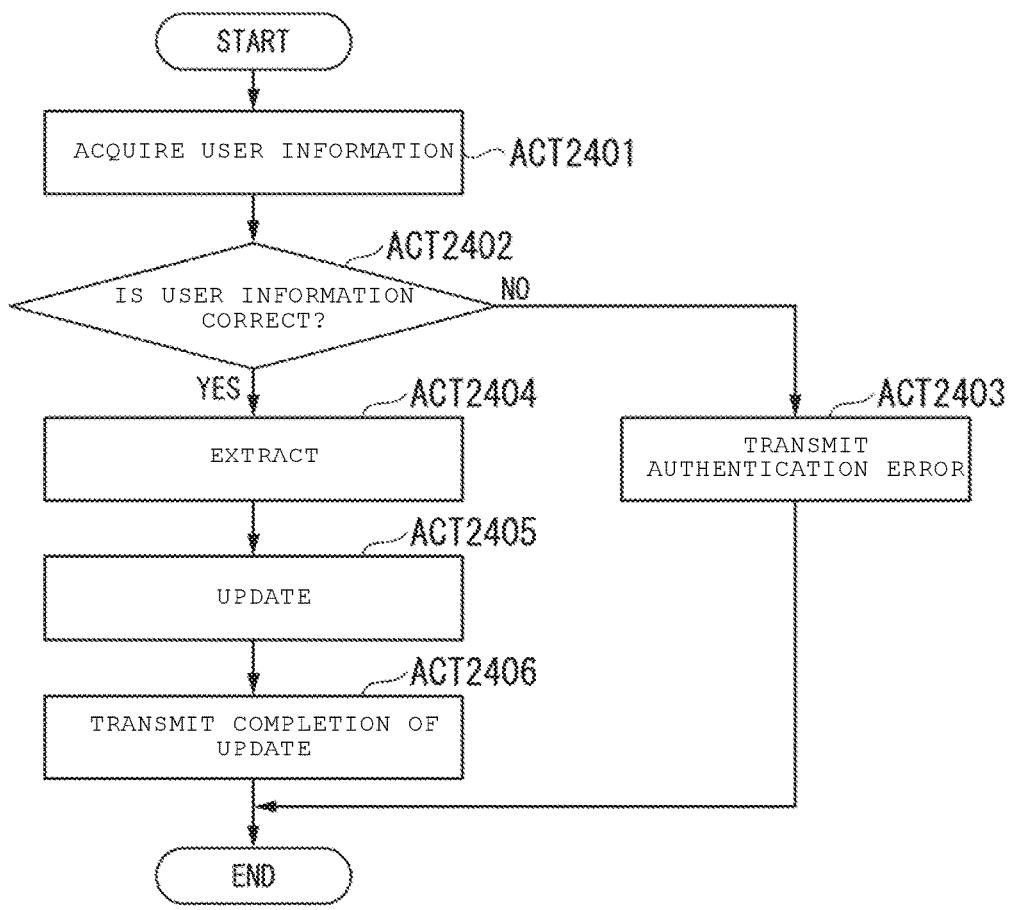
FIG. 24 is a flowchart illustrating a fifteenth example sequence of operations of the shared printer system.

FIG. 24 is a flowchart illustrating an example sequence of operations of printing job status update processing corresponding to ACT1715 in FIG. 17.

The authentication processing unit 254 acquires user information which is transmitted from the printer 100 from the transmitting and receiving unit 252 (ACT2401). The user information which is transmitted from the printer 100 is an HTTP Cookie of the user successful in the authentication by the printer 100.

The authentication processing unit 254 determines whether or not the user information received from the printer 100 is correct (ACT2402).

When it is determined that the user information is not correct (ACT2402—NO), the authentication processing unit 254 transmits information indicating an authentication error to the printer 100 from the transmitting and receiving unit 252 (ACT2403).

When it is determined that the user information is correct (ACT2402—YES), the printing job processing unit 256 acquires a printer ID, a job number, and job status information which are transmitted from the printer 100 (ACT2404).

The printing job processing unit 256 acquires a printing job corresponding to the printer ID from the printing job management table 2622. The printing job processing unit 256 updates job status information corresponding to the job number which is acquired from the printer 100 in the job numbers included in the printing job management table corresponding to the printer ID to the job status information which is acquired from the printer 100 (ACT2405).

The printing job processing unit 256 transmits a status of completing update to the printer 100 from the transmitting and receiving unit 252 (ACT2406).

In the shared printer system according to the embodiment, the printer 100 transmits the HTTP Cookie to the server device 200 as authenticated user information. The server device 200 acquires a list of printers over which the authenticated user has use authority and a list of printing jobs which is registered in a printer included in the list of the printers. Then, the server device 200 transmits the list of the printing jobs to the printer 100. When the list of the printing jobs is received from the server device 200, the printer 100 displays the list of the printing jobs on the display device. The printer 100 processes an image forming job which is selected by the user. Accordingly, printing output is able to be obtained from printers other than the printer in which the image forming job is registered.

Here, a printer in which the printing output is performed transmits information indicating the HTTP Cookie as the authenticated user information and a storage location of printing data included in the list of the printing jobs to the server device 200. Then, the printer 100 acquires printing setting information of the printers other than the printer in which the image forming job is registered and printing data from the server device 200. Here, the printer in which the printing output is performed may be configured such that the storage location of the printing data is able to be directly acquired. In this case, the printer directly acquires the printing setting information and the printing data.

When the printing output is not able to be performed in the printing setting information set with respect to the printer in which the image forming job is registered, the printer in which the printing output is performed may display that the printing output is not able to be performed. Further, the printer in which the printing output is performed may indicate printing setting by which the printing output is able to be performed in the printer.

In addition, in the shared printer system according to this embodiment, when a plurality of printers are shared in a plurality of users, cross-reference in image forming jobs is able to be performed in the plurality of shared printers, and thus, convenience is able to be improved. For example, when the plurality of printers are shared in a system using Microsoft Windows®, Google Cloud Print®, and the like, the plurality of users are able to be set in a plurality of printers or a server device managing the plurality of printers.

In the embodiment described above, an example in which the shared printer system includes three printers is described, but the embodiment is not limited to this example. For example, the shared printer system may include two printers, or may include four or more printers.

In the embodiment described above, an example in which the authentication processing is performed in the printer 100 is described, but the embodiment is not limited to this example. For example, the authentication server may perform the authentication processing.

In addition, the server device 200 may be a cloud server.

In addition, the plurality of printers may be divided into groups, and the processing described above may be performed in each group.

In addition, in the embodiment described above, a case in which the printing data which is transmitted from the terminal device is output from one printer is described, but the embodiment is not limited to this example. For example, the printing data which is transmitted from the terminal device may be output from a plurality of printers.

Furthermore, the printer 100 and the server device 200 according to the embodiment described above may include a single computer, or may include a plurality of computers which are arbitrarily allocated by dividing each of the units (functions or portions).

In the embodiment described above, the processor 101 programmed to carry out the functions of the printing job processing unit 156 is an example of a first acquisition unit, a second acquisition unit, a printing job processing unit, and a printing data acquisition unit. The display device 103 operating under the control of the processor 101 to carry out the functions of the display control unit 160 is an example of a display control unit. The printing unit 107 operating under the control of the processor 101 and implemented by the print controller to carry out the functions of the printing control unit 158 is an example of a printing control unit. The storage unit 262 operating under the control of the processor is an example of a first storage unit and a second storage unit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus for use in a print sharing system, the image forming apparatus comprising:
   a processor;
   a network interface controlled by the processor to:
      acquire identification information of a different image forming apparatus on which a user is determined to have use authority based on user identification information of the user, and
      acquire an image forming job registered with the different image forming apparatus based on the acquired identification information of the different image forming apparatus, the image forming job including print settings that were set when the image forming job was registered with the different image forming apparatus; and
   a display device controlled by the processor to display each of a plurality of image forming jobs acquired by the network interface;
   an input device configured to receive an input selecting one of the image forming jobs from the plurality of image forming jobs acquired by the network interface and displayed on the display device; and
   a printing unit controlled by the processor to print printing data corresponding to the selected image forming job, wherein:
   the processor is configured to:
      determine whether the printing unit is able to print the printing data in accordance with the print settings included in the selected image forming job, and
      when the printing unit is determined to be unable to print the printing data in accordance with the print settings included in the selected image forming job:
         change the print settings so that the printing unit is able to print the printing data in accordance with the changed print settings, and
         control the printing unit to print the printing data corresponding to the selected image forming job in accordance with the changed print settings.

2. The apparatus according to claim 1, wherein, when the processor determines that the printing unit is able to print the printing data in accordance with the print settings included in the selected image forming job, the processor controls the printing unit to print the printing data in accordance with the print settings included in the selected image forming job.

3. The apparatus according to claim 1, wherein the network interface is further controlled by the processor to:
   acquire, from the selected image forming job, location information indicating a location in which the printing data corresponding to the selected image forming job is stored, and
   acquire the printing data based on the location information.

4. The apparatus according to claim 1, wherein the processor is further configured to, when the printing unit is determined to be unable to print the printing data in accordance with the print settings included in the selected image forming job, control the display device to display a screen indicating the changes made to the print settings in the changed print settings.

5. The apparatus according to claim 1, wherein the processor determines whether the printing unit is able to print the printing data in accordance with the print settings included in the selected image forming job based on a predetermined capability of the image forming apparatus.

6. A method of controlling an image forming apparatus in a print sharing system, comprising the steps of:

acquiring identification information of a different image forming apparatus on which a user is determined to have use authority based on user identification information of the user;

acquiring an image forming job registered with the different image forming apparatus based on the acquired identification information of the different image forming apparatus, the image forming job including print settings that were set when the image forming job was registered with the different image forming apparatus;

displaying each of a plurality of acquired image forming jobs on a display device;

receiving an input selecting one of the image forming jobs from the acquired plurality of image forming jobs displayed on the display device;

determining whether the image forming apparatus is able to print printing data in accordance with the print settings included in the selected image forming job; and when the printing unit is determined to be unable to print the printing data in accordance with the print settings included in the selected image forming job:
   changing the print settings so that the printing unit is able to print the printing data in accordance with the changed print settings, and
   controlling the printing unit to print the print data corresponding to the selected image forming job in accordance with the changed print settings.

7. The method according to claim 6, further comprising the step of:
   when the printing unit is determined to be able to print the printing data in accordance with the print settings included in the selected image forming job, controlling the printing unit to print the printing data in accordance with the print settings included in the selected image forming job.

8. The method according to claim 6, further comprising the step of:
   acquiring, from the selected image forming job, location information indicating a location in which the printing data corresponding to the selected image forming job is stored, wherein the printing data is acquired based on the location information.

9. The method according to claim 6, further comprising:
   when the printing unit is determined to be unable to print the printing data in accordance with the print settings included in the selected image forming job, controlling the display device to display a screen indicating the changes made to the print settings in the changed print settings.

10. The method according to claim 6, wherein determining whether the printing unit is able to print the printing data in accordance with the print settings included in the selected image forming job is based on a predetermined capability of the image forming apparatus.

* * * * *